(12) United States Patent
Chang et al.

(10) Patent No.: US 10,784,942 B2
(45) Date of Patent: Sep. 22, 2020

(54) SYSTEM AND METHOD FOR BEAMED REFERENCE SIGNAL WITH HYBRID BEAM

(71) Applicant: Apple Inc., Cupertino, CA (US)

(72) Inventors: Wenting Chang, Beijing (CN); Gang Xiong, Portland, OR (US); Yuan Zhu, Beijing (CN); Huaning Niu, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/767,113

(22) PCT Filed: Nov. 8, 2016

(86) PCT No.: PCT/CN2016/105053
§ 371 (c)(1),
(2) Date: Apr. 9, 2018

(87) PCT Pub. No.: WO2017/080436
PCT Pub. Date: May 18, 2017

(65) Prior Publication Data
US 2019/0074890 A1    Mar. 7, 2019

Related U.S. Application Data

(63) Continuation of application No. PCT/CN2015/094104, filed on Nov. 9, 2015, and a continuation of application No. PCT/CN2016/093537, filed on Aug. 5, 2016.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04L 5/0023* (2013.01);
(Continued)

(58) Field of Classification Search
None
See application file for complete search history.

(56) References Cited

U.S. PATENT DOCUMENTS 6,157,473 A     12/2000 Jang et al.
9,578,644 B2 *  2/2017 Yu .................... H04L 5/0057
(Continued)

FOREIGN PATENT DOCUMENTS

EP      2398267         12/2011
WO   2015088419        6/2015

OTHER PUBLICATIONS

International Search Report and Written Opinion for International Patent Application No. PCT/CN2016/105053, dated Feb. 6, 2017.
(Continued)

*Primary Examiner* — Ruihua Zhang
(74) *Attorney, Agent, or Firm* — Sterne, Kessler, Goldstein & Fox P.L.L.C.

(57) ABSTRACT

Described is an apparatus of an Evolved Node-B (eNB). The apparatus may comprise a first circuitry, a second circuitry, and a third circuitry. The first circuitry may be operable to associate a first Beam Reference Signal (BRS) for a first Transmit (Tx) beam having a first beamwidth with one or more second BRSes for one or more respectively corresponding second Tx beams having a second beamwidth. The second circuitry may be operable to generate a first BRS transmission carrying the first BRS, and to generate one or more second BRS transmissions carrying the one or more respectively corresponding second BRSes. The third circuitry may be operable to provide information regarding the first BRS and the second BRSes to the second circuitry.

24 Claims, 13 Drawing Sheets

(51) Int. Cl.
    *H04W 74/08*    (2009.01)
    *H04W 16/28*    (2009.01)

(52) U.S. Cl.
    CPC ........... *H04L 5/0048* (2013.01); *H04W 16/28* (2013.01); *H04W 74/0833* (2013.01); *H04L 5/0007* (2013.01)

(56) References Cited

U.S. PATENT DOCUMENTS

| | | | |
|---|---|---|---|
| 2013/0059619 A1* | 3/2013 | Kim | H04W 72/046 455/509 |
| 2014/0146863 A1* | 5/2014 | Seol | H04B 7/0456 375/224 |
| 2014/0211891 A1* | 7/2014 | Park | H04B 1/16 375/345 |
| 2015/0003343 A1* | 1/2015 | Li | H04W 52/42 370/329 |
| 2015/0208443 A1* | 7/2015 | Jung | H04B 7/0617 370/329 |
| 2016/0344464 A1* | 11/2016 | Kim | H04B 7/0617 |
| 2017/0311353 A1* | 10/2017 | Liu | H04W 56/0015 |
| 2019/0103906 A1* | 4/2019 | Athley | H04B 7/0452 |
| 2019/0104549 A1* | 4/2019 | Deng | H04B 7/0617 |

OTHER PUBLICATIONS

International Preliminary Report on Patentability for PCT Application No. PCT/CN16/105053, dated May 24, 2018.

\* cited by examiner

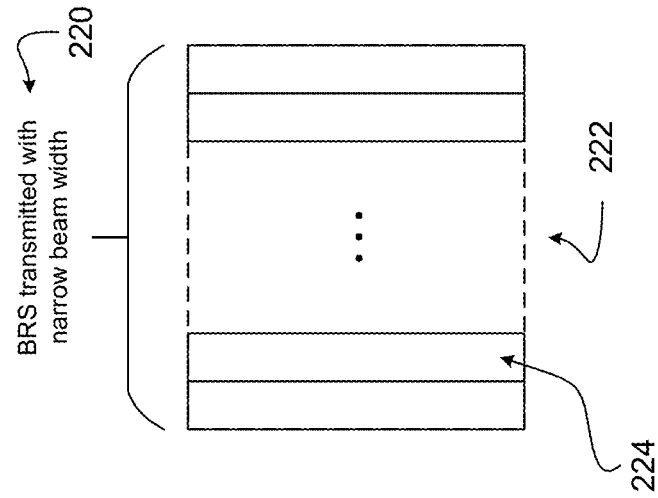
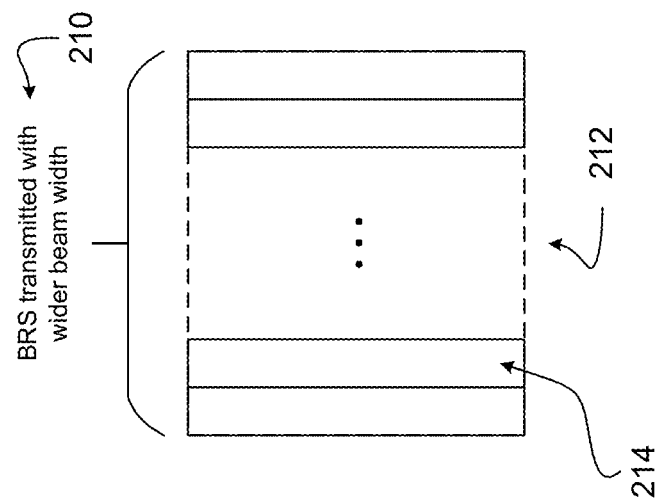
Fig. 2

US 10,784,942 B2

SYSTEM AND METHOD FOR BEAMED REFERENCE SIGNAL WITH HYBRID BEAM

CLAIM OF PRIORITY

This Application is a National Stage Entry of, and claims priority to, PCT Application No. PCT/CN16/105053, filed on 8 Nov. 2016 and entitled "System and Method for Beamed Reference Signal with Hybrid Beam," which claims priority under 35 U.S.C. § 365(c) to Patent Cooperation Treaty International Patent Application Number PCT/CN2015/094104 filed Nov. 9, 2015 and entitled "Beam Information Loading In Massive MIMO System," and claims priority under 35 U.S.C. § 365(c) to Patent Cooperation Treaty International Patent Application Number PCT/CN2016/093537 filed Aug. 5, 2016 and entitled "Beamed RS With Hybrid Beam," which are herein incorporated by reference in their entirety.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system or New Radio (NR) system. Next-generation wireless cellular communication systems may provide support for higher bandwidths in part by supporting beam forming (e.g., the shaping and targeting of transmission beams).

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIG. 2 illustrates Beam Reference Signal (BRS) transmission scenarios, in accordance with some embodiments of the disclosure.

DETAILED DESCRIPTION

Figure 1:
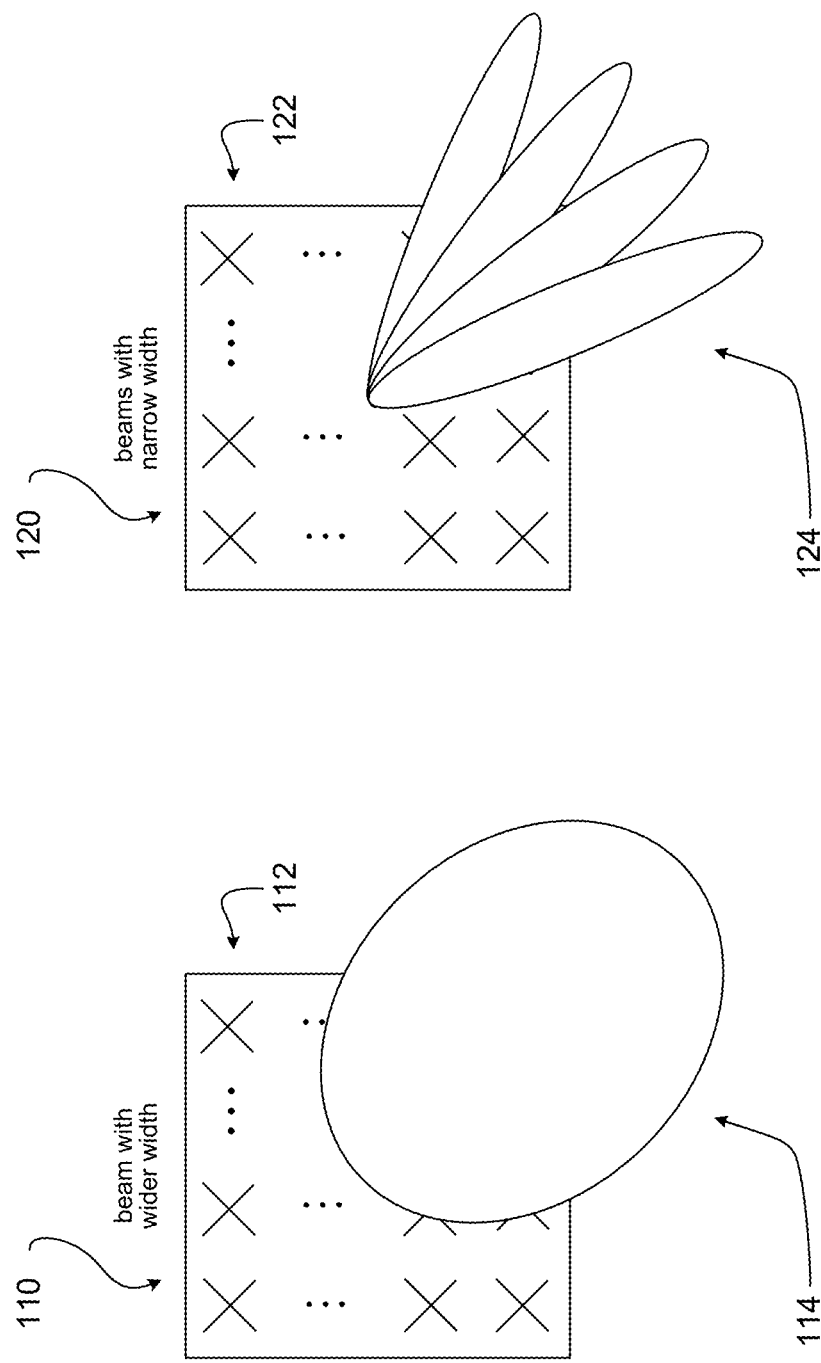
FIG. 1 illustrates beam transmission scenarios, in accordance with some embodiments of the disclosure.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system or New Radio (NR) system. Next-generation wireless cellular communication systems may provide support for higher bandwidths by supporting the shaping and targeting of wireless transmission beams, or beam forming.

In high frequency bands, beam forming—which may include Transmit (Tx) side and Receive (Rx) side beamforming—may be applied to provide signal gain, which may compensate for path-loss related to high-frequency transmission, and may suppress mutual user interference. The degree of the provided gain may impact the system capacity and coverage.

Beam forming may be performed at both eNB side and the UE side in obtaining a stable wireless link. However, initial stages, exhaustive beam searching may involve a number of beam measurements $N_T \times N_R$ (where $N_T$ may be a number of Tx beams, e.g. on an eNB side, and $N_R$ may be a number of Rx beams, e.g. on a UE side). In order to achieve desirable extents of beam forming gain, a beam should be as narrow as possible, so that the radiated energy may be focused as much as possible in a targeted direction. However, as beams are made more narrow, a spatial region may be spanned by a greater number of beams. An associated beam-searching time may then be increased, which may cause large delays for beam sweeping.

In order to realize fast beam pairing at an eNB side and a UE side, beam acquisition may be trained one step at a time. Discussed herein are hybrid Beam-formed Reference Signals (BRSes) to enable beam forming step by step, which may enable a UE to acquire a beam by first training an Rx side with respect to coarse Tx beam granularity, then training the Rx side based on the acquired Rx beam to select a narrow Tx beam. Also discussed herein are various aspects of beamed information and the configuration of beamed information.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy eNB, a next-generation or 5G eNB, an mmWave eNB, an mmWave small cell, an AP, and/or another base station for a wireless communication system. For purposes of the present disclosure, the term "UE" may refer to a UE, a 5G UE, an mmWave UE, an STA, and/or another mobile equipment for a wireless communication system.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, two widths of beams may be supported in beam-forming scenarios. Radio patterns with wider beams may be generated with a first beam weight, and radio patterns with narrower beams may be generated with a second beam weight.

FIG. 1 illustrates beam transmission scenarios, in accordance with some embodiments of the disclosure. In a first beam transmission scenario 110, an antenna panel 112, which may comprise a plurality of antennas, may transmit a first beam 114 having a first beamwidth. In a second beam transmission scenario 120, an antenna panel 122, which may comprise a plurality of antennas, may transmit a plurality of second beams 124 having a second beamwidth.

First beam 114 may span a first transmission angle, and the plurality of second beams 124 may collectively span a second transmission angle substantially similar in extent to the first spatial region. In some embodiments, the first beamwidth may accordingly be substantially similar to an integer multiple of the second beamwidth. Antenna panel 112 and antenna panel 122 may in various embodiments be implemented in the same antenna panel.

FIG. 2 illustrates BRS transmission scenarios, in accordance with some embodiments of the disclosure. In a first BRS transmission scenario 210, a set of first time-and-frequency resources 212 may carry one or more first BRS transmissions 214. In a second BRS transmission scenario 220, a set of second time-and-frequency resources 222 may carry one or more second BRS transmissions 224. First time-and-frequency resources 212 may correspond to BRS transmitted over wider beams, while second time-and-frequency resources 222 may correspond to BRS transmitted over narrower beams.

First time-and-frequency resources 212 and second time-and-frequency resources 222 may be portions of one or more Physical Resource Blocks (PRBs) spanning a number of subcarriers in frequency and a number of Orthogonal Frequency-Division Multiplexing (OFDM) symbols in time. For example, in some embodiments, first time-and-frequency resources 212 may span a first set of OFDM symbols, and second time-and-frequency resources 222 may span a second set of OFDM symbols.

Figure 3:
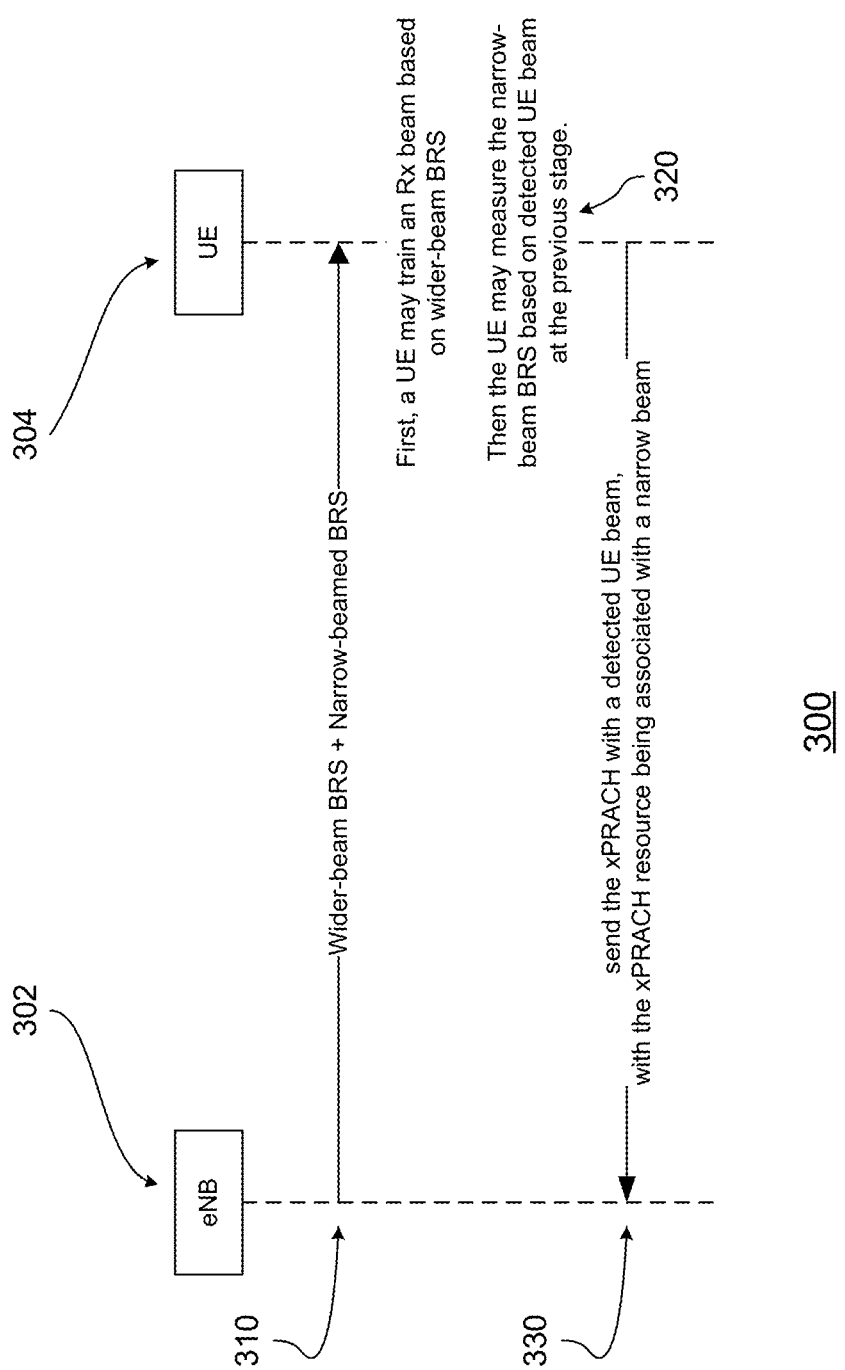
FIG. 3 illustrates a beam acquisition protocol incorporating hybrid beamed BRS, in accordance with some embodiments of the disclosure.

FIG. 3 illustrates a beam acquisition protocol incorporating hybrid beamed BRS, in accordance with some embodiments of the disclosure. A beam acquisition protocol 300 may comprise a first action 310, a second action 320, and/or a third action 330. In beam acquisition protocol 300, an eNB 302 may communicate with a UE 304 over a wireless communications network (e.g., an LTE network, or a 5G or NR network).

In first action 310, eNB 302 may transmit or begin to transmit wider-beam BRS (e.g., over beams having a wider beam width) and narrow-beam BRS (e.g., over beams having a narrower beam width). In second action 320, UE 304 may first train an Rx beam based on the wider-beam BRS, and may then measure the narrower-beam BRS based on a beam detected at the previous stage (e.g., a wider-beam BRS on which an Rx beam of UE 304 has been trained). In third action 330, UE 304 may send a Physical Random Access Channel (PRACH) transmission (and/or a 5G PRACH (xPRACH) transmission) with a detected UE beam, with the PRACH resource (and/or xPRACH resource) being associated with a narrower beam.

Accordingly, in various embodiments based on BRS signals of hybrid beam-widths, beam acquisition may be divided into two phases. In a first phase, a UE may acquire Rx beam and timing information. In order to achieve better performance, in some embodiments, one Rx beam may coherently combine multiple wider-beam BRS and may advantageously obtain a better link. In a second phase, based on an acquired Rx beam, the UE may derive an eNB side beam based on the narrower-beam BRS.

Figure 4:
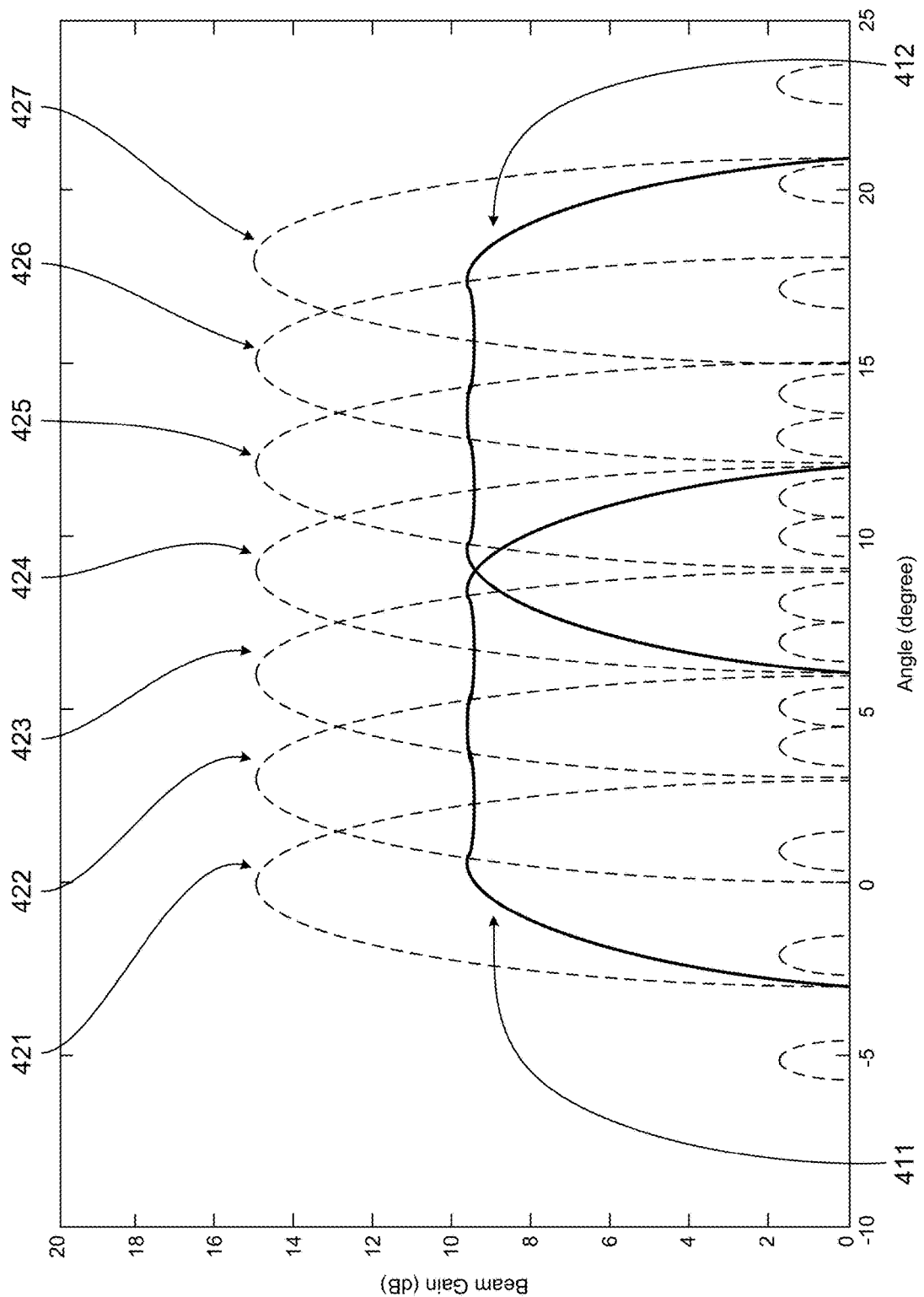
FIG. 4 illustrates an association of wide beams and narrow beams, in accordance with some embodiments of the disclosure.

FIG. 4 illustrates an association of wide beams and narrow beams, in accordance with some embodiments of the disclosure. An association 400 may comprise a first wider beam 411 and a second wider beam 412. Association 400 may also comprise a first narrower beam 421, a second narrower beam 422, a third narrower beam 423, a fourth narrower beam 424, a fifth narrower beam 425, a sixth narrower beam 426, and a seventh narrower beam 427.

An angle corresponding with first wider beam 411 may encompass part or all of angles corresponding with first narrower beam 421, second narrower beam 422, third narrower beam 423, and/or fourth narrower beam 424. An angle corresponding with second wider beam 412 may encompass part or all of angles corresponding with fourth narrower beam 424, fifth narrower beam 425, sixth narrower beam 426, and/or seventh narrower beam 427. Accordingly, a coverage of a wider-beam BRS may be associated with a collective coverage of multiple narrower-beam BRSes.

In some embodiments, a beam association rule may be predetermined (e.g., by specification). In some embodiments, the beam association rule may be configured by higher layers via a Master Information Block (MIB), a 5G MIB (xMIB), a System Information Block (SIB), and/or a 5G SIB (xSIB). In some embodiments, the beam association rule may be determined by synchronization signals such as a Primary Synchronization Signal (PSS), a 5G PSS (xPSS), a Secondary Synchronization Signal (SSS), and/or a 5G SSS (xSSS).

Figure 5:
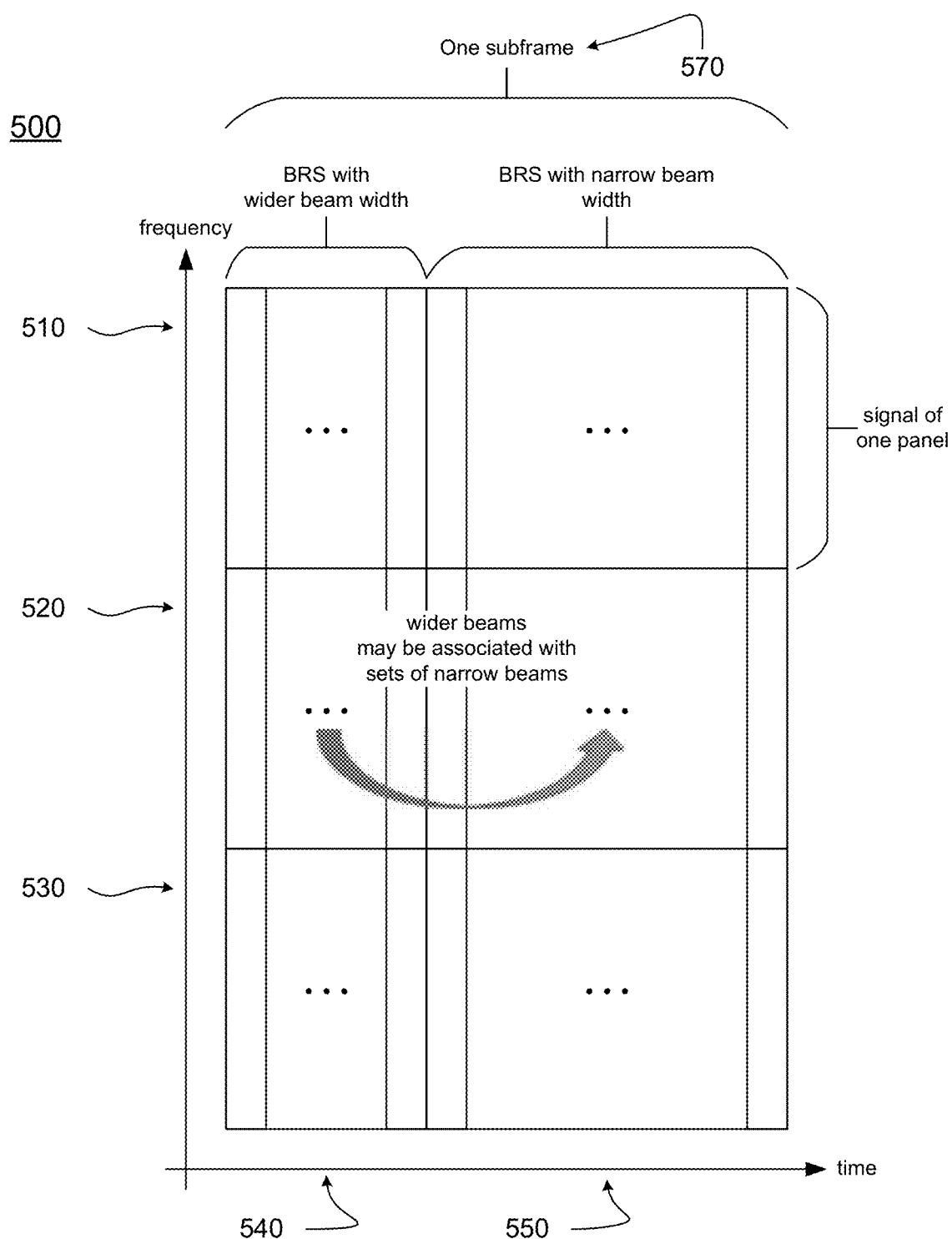
FIG. 5 illustrates a hybrid beam pattern, in accordance with some embodiments of the disclosure.

FIG. 5 illustrates a hybrid beam pattern, in accordance with some embodiments of the disclosure. A hybrid beam pattern 500 may span a set of first subcarriers 510, a set of second subcarriers 520, and a set of third subcarriers 530. Hybrid beam pattern 500 may also span a set of first OFDM symbols 540 and a set of second OFDM symbols 550.

In various embodiments, first subcarriers 510, second subcarriers 520, and third subcarriers 530 may each carry signals generated by one or more respectively corresponding antenna panels. For example, in some embodiments, an eNB may be equipped with three (or more) panels, and first subcarriers 510, second subcarriers 520, and third subcarriers 530 may each carry signals generated by one antenna panel.

In various embodiments, first OFDM symbols 540 and second OFDM symbols 550 may span one subframe 570 of a wireless communications system. First OFDM symbols may carry BRS transmitted on wider beams, while second OFDM symbols may carry BRS transmitted on narrower beams. In some embodiments, first subcarriers 510 and subframe 570 may encompass a first PRB, second subcarriers 520 and subframe 570 may encompass a second PRB, and third subcarriers 530 and subframe 570 may encompass a third PRB.

Accordingly, wider-beamed BRS and narrower-beamed BRS may be Time-Division Multiplexed (TDM), and BRS associated with beams of differing widths may be assigned within a single subframe. In such embodiments, a UE may advantageously finish beam acquisition within a single subframe.

Moreover, for first subcarrier 510, second subcarriers 520, and/or third subcarriers 530, the associated BRS with wider beam may respectively correspond with sets of one or more BRS with narrower beam.

Figure 6:
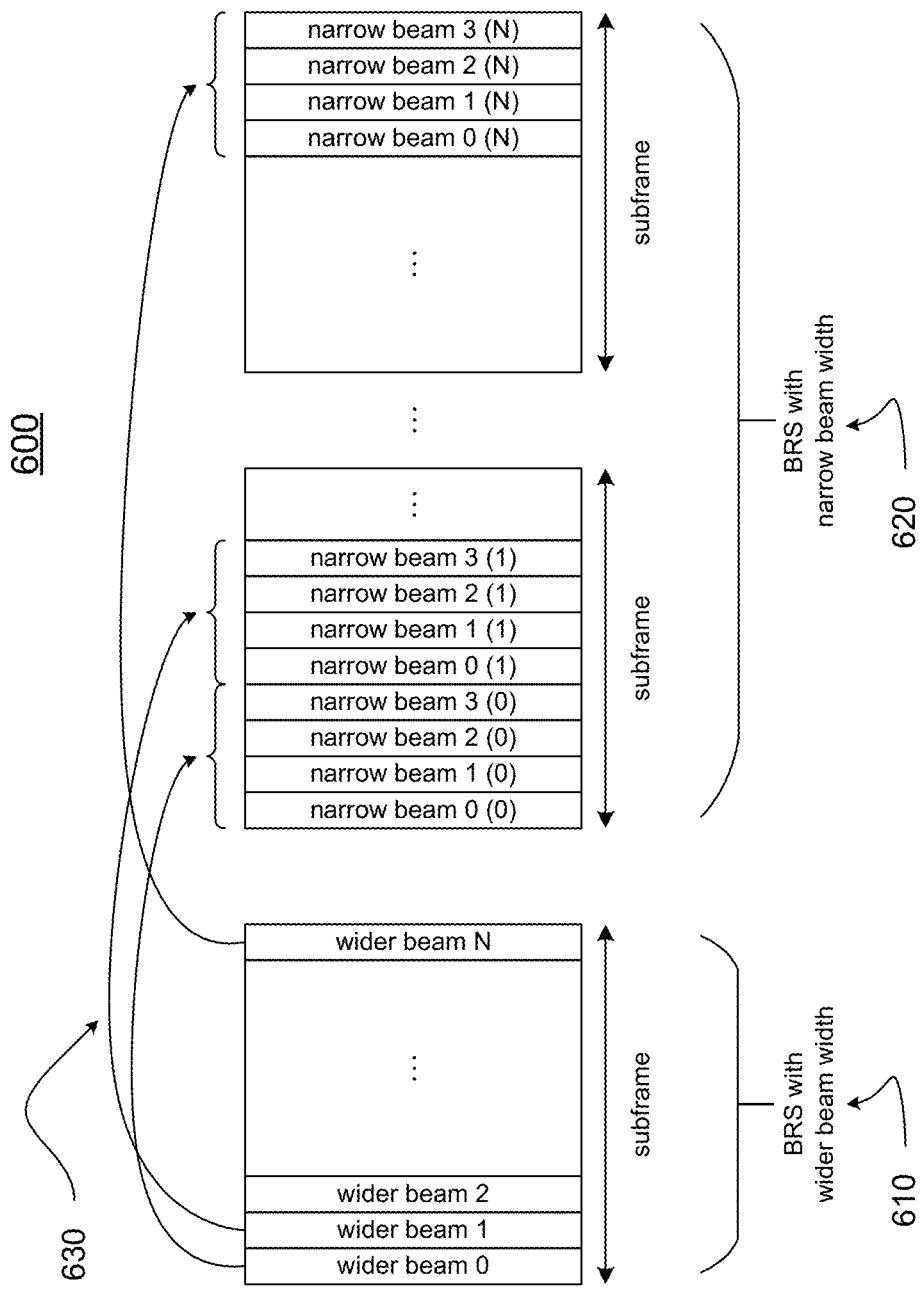
FIG. 6 illustrates a scenario of BRS beam association, in accordance with some embodiments of the disclosure.

FIG. 6 illustrates a scenario of BRS beam association, in accordance with some embodiments of the disclosure. In scenario 600, a plurality of wider beams 610 carrying BRS may be transmitted in a first set of one or more subframes, and a plurality of narrower beams 620 may be transmitted in a second set of one or more subframes. The wider beams 610 and/or the narrower beams 620 may be carried within one or more OFDM symbols (e.g., in one OFDM symbol per beam). Furthermore, wider beams 610 may be associated with sets of one or more narrower beams 620 by a respectively corresponding plurality of beam associations 630.

Accordingly, in some embodiments, BRS having wider beamwidths may be transmitted in one subframe, and BRS having narrower beamwidths may be transmitted in a plurality of subsequent subframes. The BRS having wider beamwidths may be associated with sets of the BRS having narrower beamwidths. In some embodiments, one-to-many associations between wider-beam BRS and narrower-beam BRS may be defined to accommodate fast UE beam training.

For some embodiments, one BRS Antenna Port (AP) may be transmitted in the same OFDM symbol. For other embodiments, more than one BRS AP may be transmitted in the same OFDM symbol, which may advantageously further speed up UE beam training.

Figure 7:
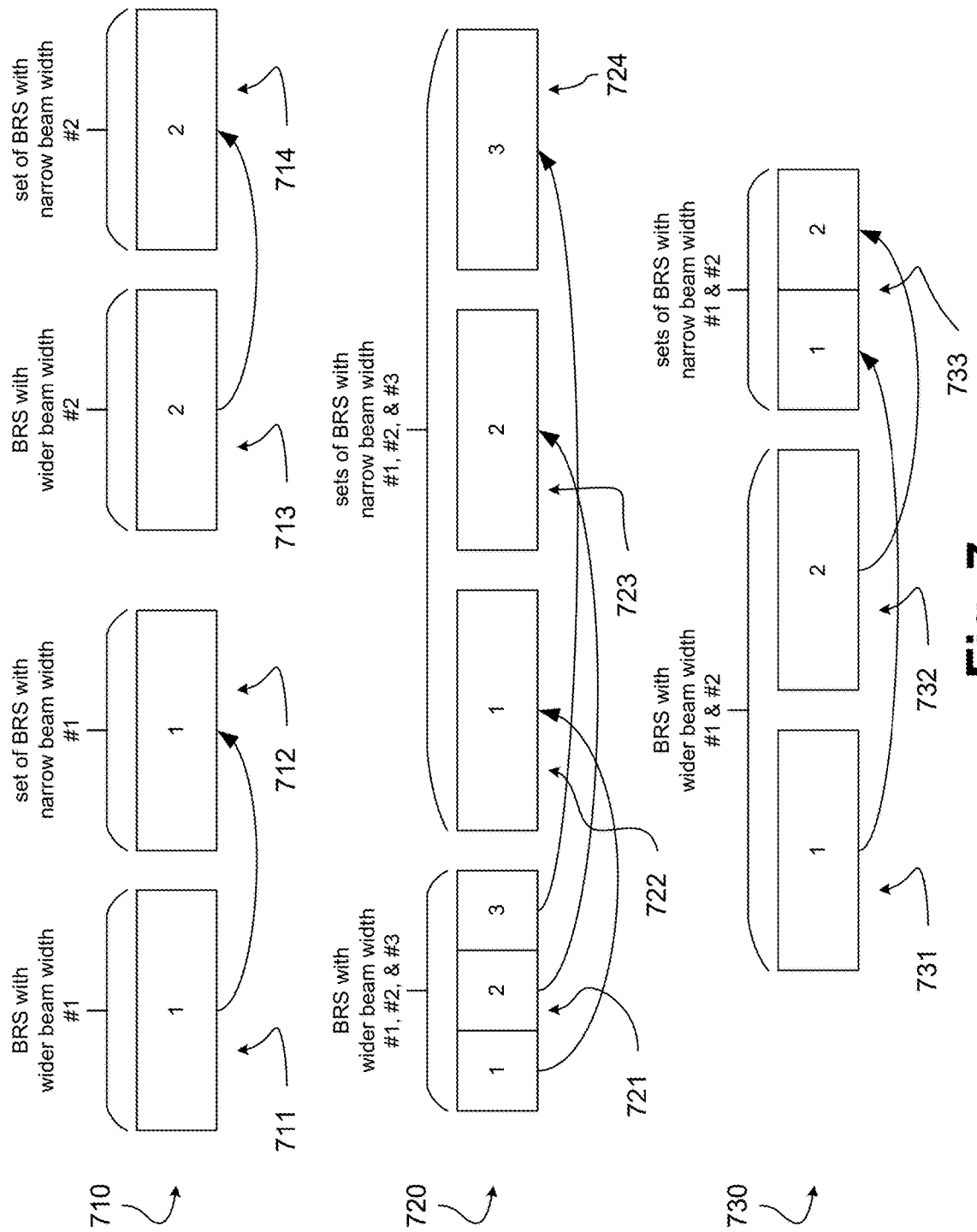
FIG. 7 illustrates scenarios of BRS beam association, in accordance with some embodiments of the disclosure.

FIG. 7 illustrates scenarios of BRS beam association, in accordance with some embodiments of the disclosure. A first scenario 710 may comprise a set of first subframes 711, a set of second subframes 712, a set of third subframes 713, and a set of fourth subframes 714. A second scenario 720 may comprise a set of first subframes 721, a set of second subframes 722, a set of third subframes 723, and a set of fourth subframes 724. A third scenario 730 may comprise a set of first subframes 731, a set of second subframes 732, and a set of third subframes 733. In these scenarios, BRSes with wider beam widths may be associated with sets of BRSes with narrower beam widths in a variety of ways.

With respect to first scenario 710, first subframes 711 and third subframes 713 may each comprise a single subframe and/or a single PRB, while second subframes 712 and fourth subframes 714 may each comprise one or more subframes and/or one or more PRBs. First subframes 711 may comprise a BRS with a wider beam width, and second subframes 712 may comprise a set of one or more BRSes with a narrower beam width. Third subframes 713 may comprise a BRS with a wider beam width, and fourth subframes 714 may comprise a set of one or more BRSes with a narrower beam width. One or more of the various beams may correspond to a set of one or more OFDM symbols. First subframes 711 and fourth subframes 714 may be transmitted over a set of frequency resources, and third subframes 713 and fourth subframes 714 may subsequently be transmitted over the set of frequency resources.

Accordingly, in some embodiments, over a set of frequency resources, a subframe in first subframes 711 may carry a wider-beam BRS (in a set of one or more OFDM symbols), and a subframe in second subframes 712 may carry a set of one or more narrower-beam BRSes (each in a set of one or more OFDM symbols) associated with the wider-beam BRS. Subsequently, over the set of frequency resources, a subframe in third subframes 713 may carry a wider-beam BRS (in a set of one or more OFDM symbols), and a subframe in fourth subframes 714 may carry a set of one or more narrower-beam BRSes (each in a set of one or more OFDM symbols) associated with the wider-beam BRS.

With respect to second scenario 720, first subframes 721 may comprise a single subframe and/or a single PRB, while second subframes 722, third subframes 723, and/or fourth subframes 724 may each comprise one or more subframes and/or one or more PRBs. First subframes 721 may comprise a plurality of BRSes with a wider beam width. Second subframes 722, third subframes 723, and fourth subframes 724 may comprise a plurality of sets of one or more BRSes with a narrower beam width. One or more of the various beams may correspond to a set of one or more OFDM symbols. First subframes 721 may be transmitted over a set of frequency resources, and second subframes 722, third subframes 723, and fourth subframes 724 may subsequently be transmitted over the set of frequency resources.

Accordingly, some embodiments, over a set of frequency resources, a subframe in first subframes 721 may carry a plurality of wider-beam BRS (each in one or more OFDM symbols). Subsequently, a plurality of subframes across second subframe 722, third subframe 723, and fourth subframe 724 may carry a respectively corresponding plurality of one or more narrower-beam BRSes (each in one or more OFDM symbols) associated with the plurality of wider-beam BRS.

With respect to third scenario 730, both first subframes 731 and second subframes 732 may comprise a single subframe and/or a single PRB, while third subframe 733 may comprise one or more subframes and/or PRBs. First subframes 731 and second subframes 732 may each comprise a BRS with a wider beam width. Third subframes 733 may comprise two BRSes with a narrower beam width. One or more of the various beams may correspond to a set of one or more OFDM symbols. First subframes 731 and second subframes 732 may be transmitted over a set of frequency resources, and third subframes 733 may subsequently be transmitted over the set of frequency resources.

Accordingly, in some embodiments, over a set of frequency resources, a subframe in first subframes 731 and a subframe in second subframes 732 may each carry a wider-beam BRS (each in one or more OFDM symbols). Subsequently, a subframe in third subframe 733 may comprise two respectively-corresponding narrower-beam BRSes (each in one or more OFDM symbols) associated with the two wider-beam BRSes.

Moreover, wider-beam BRSes may be associated with narrower-beam BRSes in a variety of ways.

In some embodiments, a BRS pattern (which may comprise a number of wider-beamed BRSes and a number of narrower-beamed BRSes and an associated between them, for example as discussed herein) may be pre-defined. In some embodiments, a BRS pattern may be established by an anchor eNB through broadcasting information, or through or higher layer signaling.

In some embodiments, BRSes with a wider beam width may be numbered from 0 to $N_{Wide}-1$, and BRSes with narrower beam width may be numbered from $N_{Wide}$ to $N_{Wide}+N_{Narrow}-1$. In such embodiments, an association between the BRSes with wider beam and BRSes with narrower beam may be:

$$n_{narrow} = N_{wide} + K n_{wide} + k, k = 0, 1, K-1$$

Where:

$n_{narrow}$ may be an index of narrower-beam BRS;

$n_{wide}$ may be an index of wider-beam BRS; and

K may be a number of narrow beams associated with one wider beam.

In some embodiments, adjacent wider beams may cover the same narrower beams. In such embodiments, an association between the BRSes with wider beam and BRSes with narrower beams may:

$$n_{narrow} = \begin{cases} k, n_{wide} = 0 \\ N_{wide} + K n_{wide} + k, k = -1, 1, K-2 \\ N_{wide} + K n_{wide} + k, k = -1, 1, K-1 \end{cases}$$

In some embodiments, different beam widths may be extended to multiple reference signals. A UE may then derive an Rx beam based on repeated wide beam reference signals, and may select a preferred Tx beam based on associated narrow beam subsets.

In some embodiments, a frame structure may contain wider beam PSS and/or narrower beam SSS. In some embodiments, a frame structure may contain wider beam PSS and/or SSS, and narrower beam BRS. In some embodiments, a frame structure may contain wider beam PSS, and narrower beam SSS and/or BRS.

Moreover, in a massive Multiple Input and Multiple output (MIMO) system, an eNB may transmit a number of BRSes.

A BRS sequence may occupy $N_{SC}^{BRS}$ subcarriers in one symbol. For example, $N_{SC}^{BRS}$ may equal 72, and a BRS sequence may occupy 72 subcarriers in one symbol. There may also be a total of $N_{BRS}$ Resource Block (RB) groups of BRS, in which each RB group may contain $N_{Sym}^{BRS}$ BRS sequences.

In some embodiments, one Tx beam may be applied to a BRS sequence. A UE may then select a Tx beam having a highest BRS Receiving Power (BRS-RP) to use and access. Since an UE may select one Tx beam for initial access, it may need to know the number of BRS sequences in order to obtain a knowledge of the number of Tx beams to measure.

The number of BRS sequences may be configured in a variety of ways. For non-standalone cases, beam information may be configured by LTE networks and/or other networks. In some embodiments, for standalone cases, beam information may be configured by a 5G eNB, such as by xPSS. In some embodiments, beam information may be configured by a 5G eNB by xSSS.

For some embodiments, xPSS may be transmitted for a UE to acquire symbol timing periodically. It may be generated based on the Zadoff-Chu sequence. Based upon the 3GPP specifications, an xPSS sequence may be given by:

$$d_u(n) = \begin{cases} e^{-j\frac{\pi u n(n+1)}{63}}, & n = 0, 1, \ldots, 30 \\ e^{-j\frac{\pi u n(n+1)(n+2)}{63}}, & n = 31, 32, \ldots, 61 \end{cases}$$

Where:

u may denote a root sequence index.

In some embodiments, the root sequence index root sequence index may be used to carry information regarding a number $N_{BRS}$ of RB groups. For example, the root sequence index may be as listed in Table 1. Note that other root indexes for xPSS sequence generation may be easily extended from the examples listed herein. Also, although the embodiments below list $N_{BRS}$ as being 2 or 4 or 6 (for example), other values of $N_{BRS}$ are envisioned in the scope of this disclosure as being configurable in the various manners discussed herein.

TABLE 1

Example for root indices for xPSS

| $N_{BRS}$ | Root index u |
|---|---|
| 2 | 25 |
| 4 | 29 |
| 6 | 34 |

If values of $N_{BRS}$ greater than 6 are defined by the network, more root indices may be used. In some embodiments, a root index of 34 may be used to indicate cases of $N_{BRS}$ greater than or equal to 6, and a UE may then consider the number $N_{BRS}$ to be a maximum number of BRS RB groups defined by the network.

For some embodiments, if information regarding a cell ID $N_{ID}^{(2)}$ is disposed to being carried by xPSS, then $N_{ID}^{(2)}$ and $N_{BRS}$ may both be derived from the root index, for example as listed in Table 2.

TABLE 2

Another example for root indices for xPSS

| $N_{ID}^{(2)}$ | $N_{BRS}$ | Root index u |
|---|---|---|
| 0 | 2 | 25 |
| 1 | 2 | 29 |
| 2 | 2 | 34 |
| 0 | 4 | 39 |
| 1 | 4 | 44 |
| 2 | 4 | 59 |

In some embodiments, one eNodeB may transmit different root indices in different subframes. Three xPSS sequences may be utilized for $N_{ID}^{(2)}$ and $N_{BRS}$ configuration. For example, a root index may be obtained as listed in Table 3, where the first number may be used for subframe 0 and the second number may be used for subframe 25. In this way, a number of sequence candidates may still be three, and the UE may detect $N_{ID}^{(2)}$ and $N_{BRS}$ in two xPSS subframes.

TABLE 3

Another example for root indices for xPSS

| $N_{ID}^{(2)}$ | $N_{BRS}$ | Root index u |
|---|---|---|
| 0 | 2 | [25 25] |
| 1 | 2 | [29 29] |
| 2 | 2 | [34 34] |
| 0 | 4 | [25 29] |
| 1 | 4 | [25 34] |
| 2 | 4 | [29 34] |

For some embodiments, for an UE with Rx beamforming, different Rx beams may be used to measure BRS-RP. Tx beams may then be divided into several groups, and each Tx beam group may be transmitted in N consecutive symbols for a BRS subframe. The number of consecutive symbols N may be obtained based on the $N_{BRS}$ as:

$$N = f(N_{BRS})$$

Where:

$f(\ )$ may denote a mapping function between $N_{BRS}$ and N, which may be defined by a network.

In some embodiments, $N = [K/N_{BRS}]$ may determined as follows:

$$N = [K/N_{BRS}]$$

Where:

K may indicate a number of Tx beams in one Tx beam group, which may be defined by the network.

For example, the mapping function $f(\ )$ may be defined such that be $f(2)=6$, $f(4)=4$, and $f(>4)=3$.

In some embodiments, xPSS may use a combined beam based on the beams for BRS in the same symbol. A beam for xPSS may be obtained as:

$$P = \frac{1}{\sqrt{N_{BRS}}} \sum_{j=1}^{N_{BRS}} P_j$$

Where:

$P_j$ may indicate a Tx beam for BRS resource j. A correlation between each Tx beam of the BRS in one symbol may be low.

A UE may the detect the BRS assuming $N_{BRS}$ is equal to a maximum number of BRS RB groups defined by the network. The UE may estimate $N_{BRS}$ by a ratio between a power of a strongest cluster in xPSS and a power of the same cluster of the BRS with the strongest BRS-RP in a symbol (e.g., in the same symbol).

An estimated number of BRS RB groups $\tilde{N}_{BRS}$ may be calculated as:

$$\tilde{N}_{BRS} = \underset{k=2,4,\ldots N_{BRS}^{max}}{\operatorname{argmin}} \left\{ \left| \frac{1}{k} - \frac{\gamma_{PSS}}{\gamma_{BRS}} \right| \right\}$$

Where:

$N_{BRS}^{max}$ may denote a maximum number of BRS RB groups defined in the network;

$\gamma_{PSS}$ may indicate an estimated power of a strongest channel cluster x in xPSS; and $\gamma_{BRS}$ may refers to an estimated power of a channel cluster x in the BRS by which the maximum BRS-RP may be obtained in the same symbol as xPSS.

For some embodiments, a UE may detect $N_{BRS}$ blindly. Received BRS with a BRS-RP higher than a threshold BRS-RP may be considered as a validly detected BRS. The UE may the detect the possible BRS resources and consider $N_{BRS}$ to be the maximum number of RB groups for BRS detected. For example, if BRS is validly detected in subcarriers used for BRS resources 2, 4, and 6, a UE may consider $N_{BRS}$ to be 6.

In some embodiments, an orthogonal cover code may be applied in xPSS for beam information loading. To increase the probability of cover code detection, more successive xPSS symbols may be used to carry the same cover code. Different cover codes may be utilized to imply different values of $N_{BRS}$. An example of three successive symbols carry one cover code is illustrated in Table 4, where 4 different cover codes may be used:

TABLE 4

An example of cover code for beam information loading

| Cover code | $N_{BRS}$ |
|---|---|
| [1 1 1 1] | 2 |
| [1 −1 1 −1] | 4 |
| [1 1 −1 −1] | 6 |
| [1 −1 −1 1] | Reserved |

For some embodiments, different scrambling codes may be applied on an xPSS signal to carry BRS loading information. In particular, xPSS can be generated as:

$$S_l(n) = a(n) \cdot b_l(n)$$

Where:

a(n) may be a Zadoff-Chu sequence;

$b_l(n)$ may be an M-sequence with different scrambling phase l; and l may be 0, 1, . . . , $L_0$−1.

$L_0$ may equal 3, for example, which may be used to indicate a number of BRS RS resources.

Figure 8:
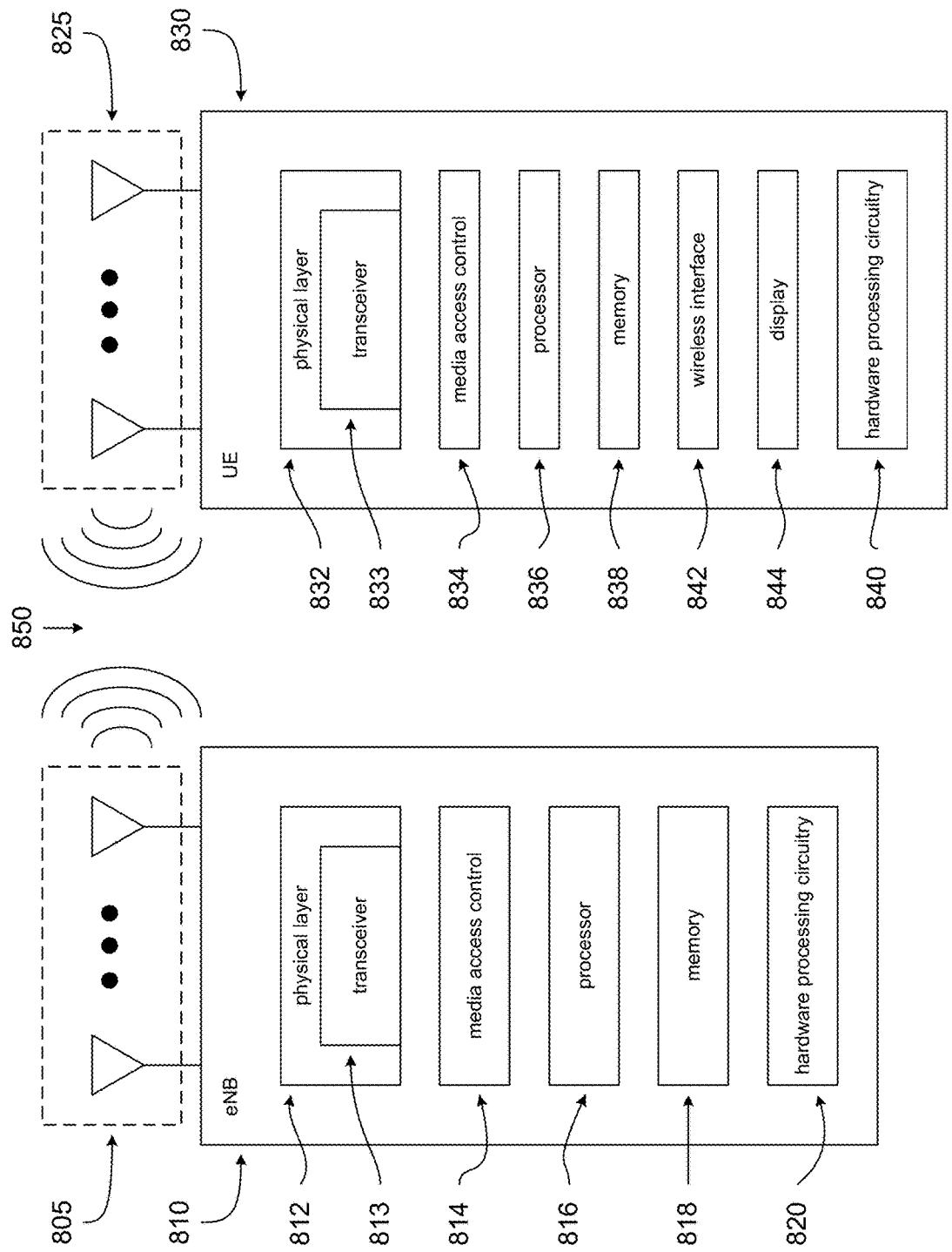
FIG. 8 illustrates an Evolved Node B (eNB) and a User Equipment (UE), in accordance with some embodiments of the disclosure.

FIG. 8 illustrates an eNB and a UE, in accordance with some embodiments of the disclosure. FIG. 8 includes block diagrams of an eNB 810 and a UE 830 which are operable to co-exist with each other and other elements of an LTE network. High-level, simplified architectures of eNB 810 and UE 830 are described so as not to obscure the embodiments. It should be noted that in some embodiments, eNB 810 may be a stationary non-mobile device.

eNB 810 is coupled to one or more antennas 805, and UE 830 is similarly coupled to one or more antennas 825. However, in some embodiments, eNB 810 may incorporate or comprise antennas 805, and UE 830 in various embodiments may incorporate or comprise antennas 825.

In some embodiments, antennas 805 and/or antennas 825 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 805 are separated to take advantage of spatial diversity.

eNB 810 and UE 830 are operable to communicate with each other on a network, such as a wireless network. eNB 810 and UE 830 may be in communication with each other over a wireless communication channel 850, which has both a downlink path from eNB 810 to UE 830 and an uplink path from UE 830 to eNB 810.

As illustrated in FIG. 8, in some embodiments, eNB 810 may include a physical layer circuitry 812, a MAC (media access control) circuitry 814, a processor 816, a memory 818, and a hardware processing circuitry 820. A person skilled in the art will appreciate that other components not shown may be used in addition to the components shown to form a complete eNB.

In some embodiments, physical layer circuitry 812 includes a transceiver 813 for providing signals to and from UE 830. Transceiver 813 provides signals to and from UEs or other devices using one or more antennas 805. In some embodiments, MAC circuitry 814 controls access to the wireless medium. Memory 818 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 820 may comprise logic devices or circuitry to perform various operations. In some embodiments, processor 816 and memory 818 are arranged to perform the operations of hardware processing circuitry 820, such as operations described herein with reference to logic devices and circuitry within eNB 810 and/or hardware processing circuitry 820.

Accordingly, in some embodiments, eNB 810 may be a device comprising an application processor, a memory, one or more antenna ports, and an interface for allowing the application processor to communicate with another device.

As is also illustrated in FIG. 8, in some embodiments, UE 830 may include a physical layer circuitry 832, a MAC circuitry 834, a processor 836, a memory 838, a hardware processing circuitry 840, a wireless interface 842, and a display 844. A person skilled in the art would appreciate that other components not shown may be used in addition to the components shown to form a complete UE.

In some embodiments, physical layer circuitry 832 includes a transceiver 833 for providing signals to and from eNB 810 (as well as other eNBs). Transceiver 833 provides signals to and from eNBs or other devices using one or more antennas 825. In some embodiments, MAC circuitry 834 controls access to the wireless medium. Memory 838 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 842 may be arranged to allow the processor to communicate with another device. Display 844 may provide a visual and/or tactile display for a user to interact with UE 830, such as a touch-screen display. Hardware processing circuitry 840 may comprise logic devices or circuitry to perform various operations. In some embodiments, processor 836 and memory 838 may be arranged to perform the operations of hardware processing circuitry 840, such as operations described herein with reference to logic devices and circuitry within UE 830 and/or hardware processing circuitry 840.

Accordingly, in some embodiments, UE 830 may be a device comprising an application processor, a memory, one or more antennas, a wireless interface for allowing the application processor to communicate with another device, and a touch-screen display.

Elements of FIG. 8, and elements of other figures having the same names or reference numbers, can operate or function in the manner described herein with respect to any such figures (although the operation and function of such elements is not limited to such descriptions). For example, FIGS. 9-10 and 13 also depict embodiments of eNBs, hardware processing circuitry of eNBs, UEs, and/or hardware processing circuitry of UEs, and the embodiments described with respect to FIG. 8 and FIGS. 9-10 and 13 can operate or function in the manner described herein with respect to any of the figures.

In addition, although eNB 810 and UE 830 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 9:
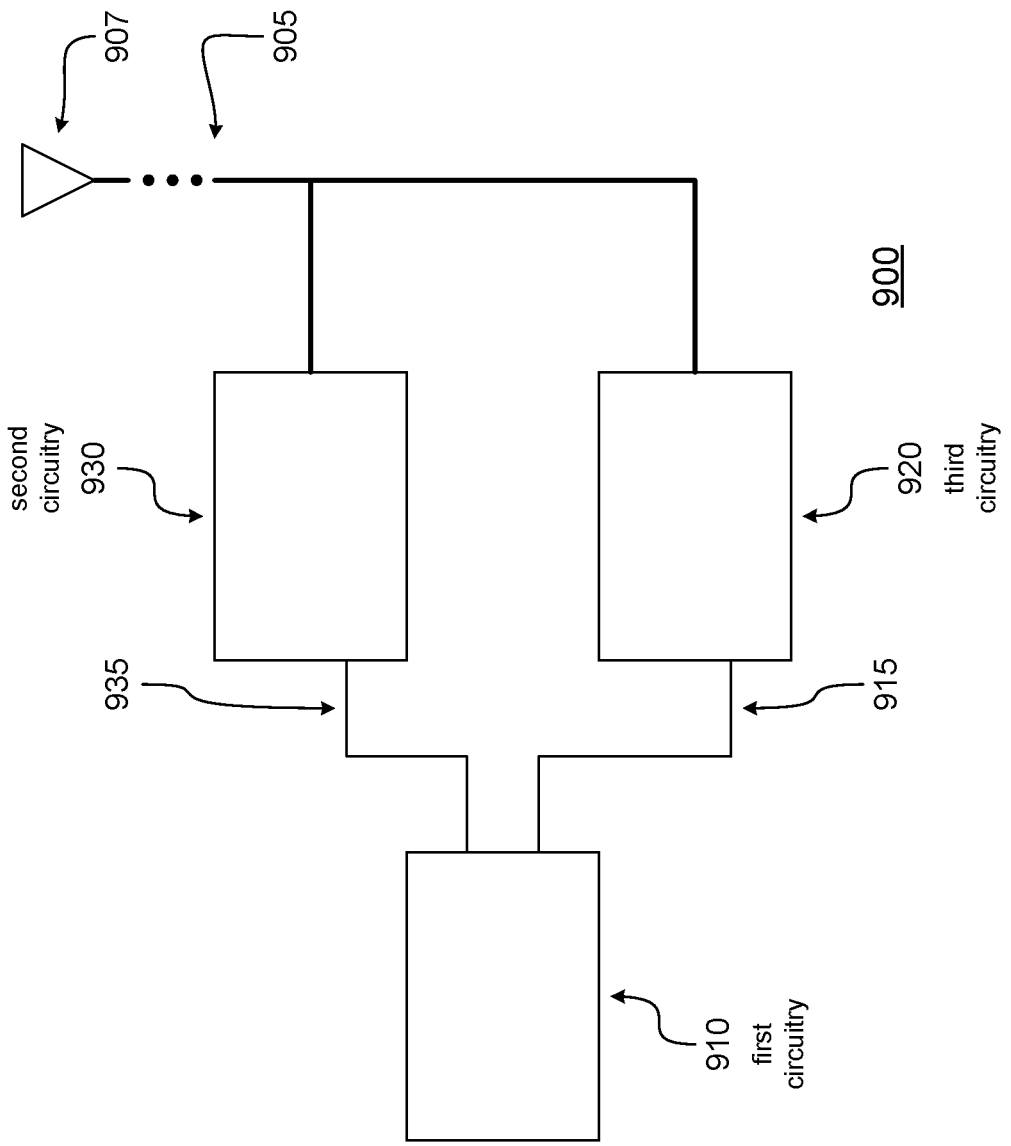
FIG. 9 illustrates hardware processing circuitries for an eNB for hybrid Beamed Reference Signal (BRS) training, in accordance with some embodiments of the disclosure.

FIG. 9 illustrates hardware processing circuitries for an eNB for hybrid Beamed Reference Signal (BRS) training, in accordance with some embodiments of the disclosure. With reference to FIG. 8, an eNB may include various hardware processing circuitries discussed below (such as hardware processing circuitry 900 of FIG. 9), which may in turn comprise logic devices and/or circuitry operable to perform various operations. For example, in FIG. 8, eNB 810 (or various elements or components therein, such as hardware processing circuitry 820, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 816 (and/or one or more other processors which eNB 810 may comprise), memory 818, and/or other elements or components of eNB 810 (which may include hardware processing circuitry 820) may be arranged to perform the operations of these hardware processing circuitries, such as operations described herein with reference to devices and circuitry within these hardware processing circuitries. In some embodiments, processor 816 (and/or one or more other processors which eNB 810 may comprise) may be a baseband processor.

Returning to FIG. 9, an apparatus of eNB 810 (or another eNB or base station), which may be operable to communicate with one or more UEs on a wireless network, may comprise hardware processing circuitry 900. In some embodiments, hardware processing circuitry 900 may comprise one or more antenna ports 905 operable to provide various transmissions over a wireless communication channel (such as wireless communication channel 850). Antenna ports 905 may be coupled to one or more antennas 907 (which may be antennas 805). In some embodiments, hardware processing circuitry 900 may incorporate antennas 907, while in other embodiments, hardware processing circuitry 900 may merely be coupled to antennas 907.

Antenna ports 905 and antennas 907 may be operable to provide signals from an eNB to a wireless communications channel and/or a UE, and may be operable to provide signals from a UE and/or a wireless communications channel to an eNB. For example, antenna ports 905 and antennas 907 may be operable to provide transmissions from eNB 810 to wireless communication channel 850 (and from there to UE 830, or to another UE). Similarly, antennas 907 and antenna ports 905 may be operable to provide transmissions from a wireless communication channel 850 (and beyond that, from UE 830, or another UE) to eNB 810.

With reference to FIG. 9, hardware processing circuitry 900 may comprise a first circuitry 910, a second circuitry 920, and/or a third circuitry 930. First circuitry 910 may be operable to associate a first BRS for a first Tx beam having a first beamwidth with one or more second BRSes for one or more respectively corresponding second Tx beams having a second beamwidth. First circuitry 910 may be operable to provide information regarding the first BRS and the second BRSes to second circuitry 920 by an interface 915. Second circuitry 920 may be operable to generate a first BRS transmission carrying the first BRS. Second circuitry 920 may also be operable to generate one or more second BRS transmissions carrying the one or more respectively corresponding second BRSes. The first beamwidth may be greater than the second beamwidth. Third circuitry 930 may be operable to process various transmissions, and may provide information regarding received transmissions to first circuitry 910 over an interface 935.

In some embodiments, the association of the first BRS with the one or more second BRSes is predetermined. The association of the first BRS with the one or more second BRSes may be configured by at least one of: a MIB transmission, a SIB transmission, a PSS transmission, or a SSS transmission.

For some embodiments, the first Tx beam may have a radial span substantially encompassing one or more respectively corresponding radial spans of the one or more second Tx beams. In some embodiments, the first BRS transmission may carry timing information. For some embodiments, first circuitry 910 may be operable to associate a PRACH with one of the second Tx beams. In some embodiments, the first BRS transmission and the one or more second BRS transmissions may be transmitted in the same subframe. For some embodiments, the first BRS transmission may be transmitted in a first subframe, and the one or more second BRS transmissions are transmitted in a second subframe subsequent to the first subframe.

In some embodiments, at least one transmission of the first BRS transmission and the one or more second BRS transmissions may be transmitted within a BRS sequence that spans one OFDM symbol and spans a predetermined number of subcarrier frequencies across a predetermined number of PRBs. For some embodiments, the BRS sequence may span 72 subcarrier frequencies comprising at least one of: a wide beamwidth BRS, or a narrow beamwidth BRS. In some embodiments, the predetermined number of PRBs may be established at least in part by a Zadoff-Chu root sequence index. For some embodiments, the Zadoff-Chu root sequence index may be for a Synchronization Signal sequence generation. In some embodiments, the Synchronization Signal sequence generation may be a PSS sequence generation. For some embodiments, the predetermined number of PRBs may be established at least in part by a Cell ID. In some embodiments, the predetermined number of PRBs may be established at least in part by a subframe index.

In some embodiments, first circuitry 910, second circuitry 920, and/or third circuitry 930 may be implemented as separate circuitries. In other embodiments, first circuitry 910, second circuitry 920, and/or third circuitry 930 may be combined and implemented together in a circuitry without altering the essence of the embodiments.

Figure 10:
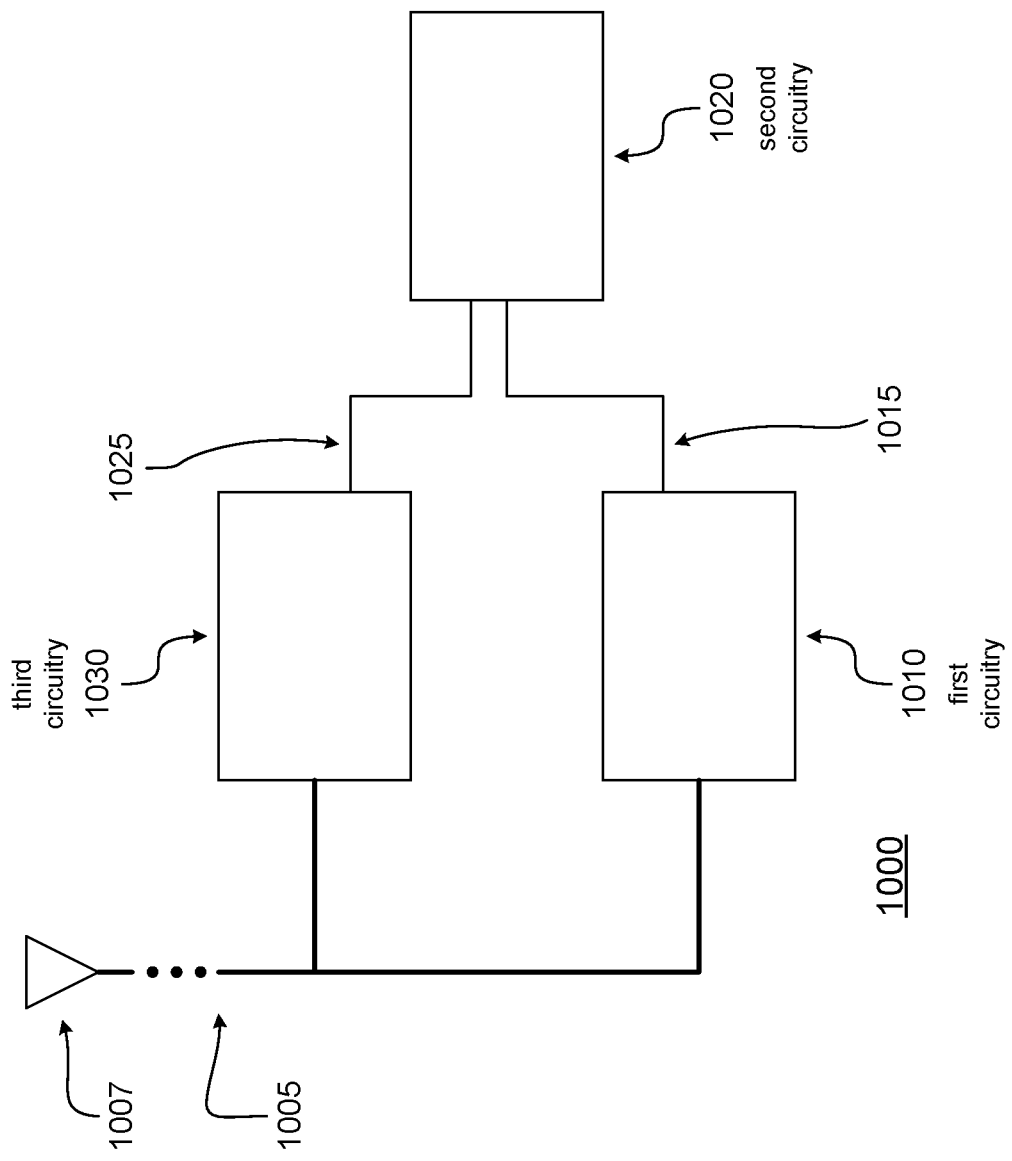
FIG. 10 illustrates hardware processing circuitries for a UE for hybrid Beamed Reference Signal (BRS) training, in accordance with some embodiments of the disclosure.

FIG. 10 illustrates hardware processing circuitries for a UE for hybrid Beamed Reference Signal (BRS) training, in accordance with some embodiments of the disclosure. With reference to FIG. 8, a UE may include various hardware processing circuitries discussed below (such as hardware processing circuitry 1000 of FIG. 10), which may in turn comprise logic devices and/or circuitry operable to perform various operations. For example, in FIG. 8, UE 830 (or various elements or components therein, such as hardware processing circuitry 840, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 836 (and/or one or more other processors which UE 830 may comprise), memory 838, and/or other elements or components of UE 830 (which may include hardware processing circuitry 840) may be arranged to perform the operations of these hardware processing circuitries, such as operations described herein with reference to devices and circuitry within these hardware processing circuitries. In some embodiments, processor 836 (and/or one or more other processors which UE 830 may comprise) may be a baseband processor.

Returning to FIG. 10, an apparatus of UE 830 (or another UE or mobile handset), which may be operable to communicate with one or more eNBs on a wireless network, may comprise hardware processing circuitry 1000. In some embodiments, hardware processing circuitry 1000 may comprise one or more antenna ports 1005 operable to provide various transmissions over a wireless communication channel (such as wireless communication channel 850). Antenna ports 1005 may be coupled to one or more antennas 1007 (which may be antennas 825). In some embodiments, hardware processing circuitry 1000 may incorporate antennas 1007, while in other embodiments, hardware processing circuitry 1000 may merely be coupled to antennas 1007.

Antenna ports 1005 and antennas 1007 may be operable to provide signals from a UE to a wireless communications channel and/or an eNB, and may be operable to provide signals from an eNB and/or a wireless communications channel to a UE. For example, antenna ports 1005 and antennas 1007 may be operable to provide transmissions from UE 830 to wireless communication channel 850 (and from there to eNB 810, or to another eNB). Similarly, antennas 1007 and antenna ports 1005 may be operable to provide transmissions from a wireless communication channel 850 (and beyond that, from eNB 810, or another eNB) to UE 830.

With reference to FIG. 10, hardware processing circuitry 1000 may comprise a first circuitry 1010, a second circuitry 1020, and/or a third circuitry 1030. First circuitry 910 may be operable to process a first BRS transmission corresponding to a first Tx beam having a first beamwidth. First circuitry 910 may also be operable to process one or more second BRS transmissions respectively corresponding to one or more second Tx beams having a second beamwidth. First circuitry may be operable to provide information regarding the first Tx beam and/or the second Tx beams to second circuitry 920 over an interface 1015. Second circuitry 920 may be operable to associate a PRACH with one of the second Tx beams. The first beamwidth may be greater than the second beamwidth. Third circuitry 1030 may be operable to generate various transmissions, and second circuitry 1020 may provide information regarding generated transmissions to third circuitry 1030 over an interface 1025.

In some embodiments, the first Tx beam may have a radial span substantially encompassing one or more respectively corresponding radial spans of the one or more second Tx beams. For some embodiments, the first BRS transmission may carry timing information. In some embodiments, the first BRS transmission and the one or more second BRS transmissions may be transmitted in the same subframe. For some embodiments, the first BRS transmission is transmitted in a first subframe, and the one or more second BRS transmissions are transmitted in a second subframe subsequent to the first subframe.

For some embodiments, first circuitry 1010 may be operable to process an additional BRS transmission corresponding to another Tx beam having the first beamwidth. In some embodiments, the first BRS transmission may be coherently combined with the additional BRS transmission.

In some embodiments, at least one transmission of the first BRS transmission and the one or more second BRS transmissions may be transmitted within a BRS sequence that spans one OFDM symbol and may span a predetermined number of subcarrier frequencies across a predetermined number of PRBs. For some embodiments, the BRS sequence may span 72 subcarrier frequencies comprising at least one of: a wide beamwidth BRS, or a narrow beamwidth BRS. In some embodiments, the predetermined number of PRBs may be established at least in part by a Zadoff-Chu root sequence index. For some embodiments, the Zadoff-Chu root sequence index may be for a Synchronization Signal sequence generation. In some embodiments, the Synchronization Signal sequence generation is a PSS sequence generation. For some embodiments, the predetermined number of PRBs may be established at least in part by a Cell ID. In some embodiments, the predetermined number of PRBs may be established at least in part by a subframe index.

In some embodiments, first circuitry 1010, second circuitry 1020, and/or third circuitry 1030 may be implemented as separate circuitries. In other embodiments, first circuitry 1010, second circuitry 1020, and third circuitry 1030 may be combined and implemented together in a circuitry without altering the essence of the embodiments.

Figure 11:
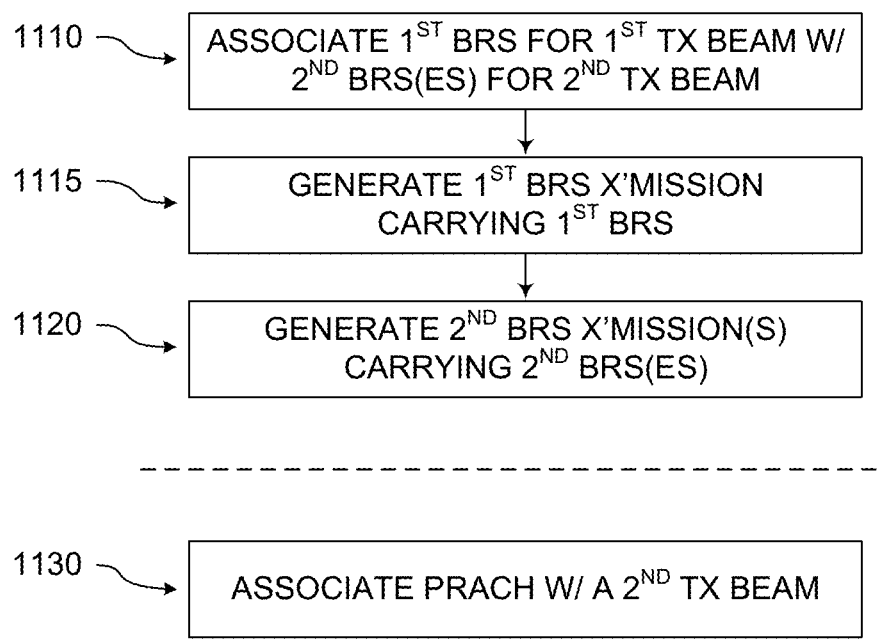
FIG. 11 illustrates methods for an eNB for hybrid Beamed Reference Signal (BRS) training, in accordance with some embodiments of the disclosure.

FIG. 11 illustrates methods for an eNB for hybrid Beamed Reference Signal (BRS) training, in accordance with some embodiments of the disclosure. With reference to FIG. 8, various methods that may relate to eNB 810 and hardware processing circuitry 820 are discussed below. Although the actions in method 1100 of FIG. 11 are shown in a particular order, the order of the actions can be modified. Thus, the illustrated embodiments can be performed in a different order, and some actions may be performed in parallel. Some of the actions and/or operations listed in FIG. 11 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 810 and/or hardware processing circuitry 820 to perform an operation comprising the methods of FIG. 11. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 11.

Returning to FIG. 11, a method 1100 may comprise an associating 1110, a generating 1115, a generating 1120, and an associating 1130. In associating 1110, a first BRS for a first Tx beam having a first beamwidth may be associated with one or more second BRSes for one or more respectively corresponding second Tx beams having a second beamwidth. In generating 1115, a first BRS transmission carrying the first BRS may be generated. In generating 1120, one or more second BRS transmissions carrying the one or more respectively corresponding second BRSes may be generated. The first beamwidth may be greater than the second beamwidth.

In some embodiments, the association of the first BRS with the one or more second BRSes is predetermined. The association of the first BRS with the one or more second BRSes may be configured by at least one of: a MIB transmission, a SIB transmission, a PSS transmission, or a SSS transmission.

For some embodiments, the first Tx beam may have a radial span substantially encompassing one or more respectively corresponding radial spans of the one or more second Tx beams. In some embodiments, the first BRS transmission may carry timing information. In associating 1130, a PRACH may be associated with one of the second Tx beams. In some embodiments, the first BRS transmission and the one or more second BRS transmissions may be transmitted in the same subframe. For some embodiments, the first BRS transmission may be transmitted in a first subframe, and the one or more second BRS transmissions are transmitted in a second subframe subsequent to the first subframe.

In some embodiments, at least one transmission of the first BRS transmission and the one or more second BRS transmissions may be transmitted within a BRS sequence that spans one OFDM symbol and spans a predetermined number of subcarrier frequencies across a predetermined number of PRBs. For some embodiments, the BRS sequence may span 72 subcarrier frequencies comprising at least one of: a wide beamwidth BRS, or a narrow beamwidth BRS. In some embodiments, the predetermined number of PRBs may be established at least in part by a Zadoff-Chu root sequence index. For some embodiments, the Zadoff-Chu root sequence index may be for a Synchronization Signal sequence generation. In some embodiments, the Synchronization Signal sequence generation may be a PSS sequence generation. For some embodiments, the predetermined number of PRBs may be established at least in part by a Cell ID. In some embodiments, the predetermined number of PRBs may be established at least in part by a subframe index.

Figure 12:
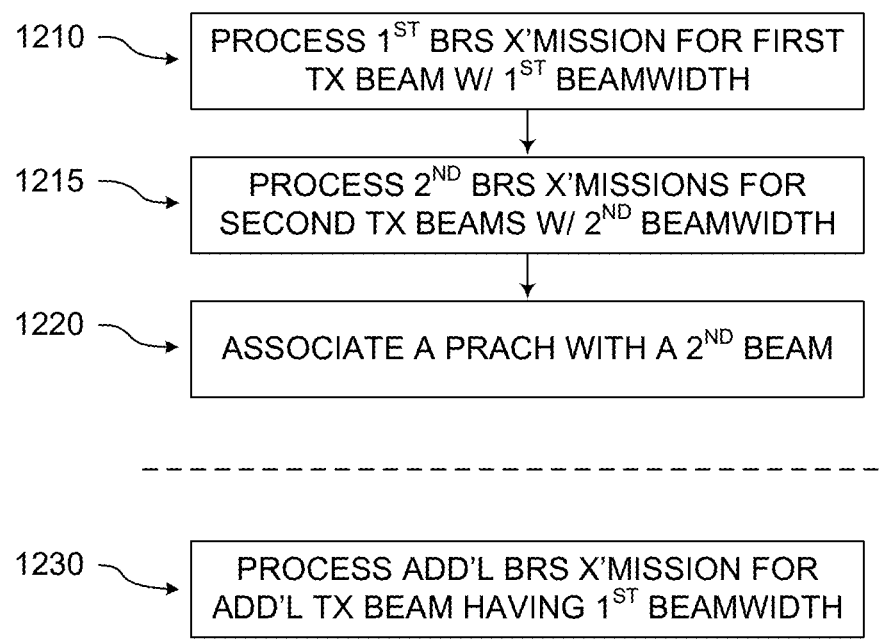
FIG. 12 illustrates methods for a UE for hybrid Beamed Reference Signal (BRS) training, in accordance with some embodiments of the disclosure.

FIG. 12 illustrates methods for a UE for hybrid Beamed Reference Signal (BRS) training, in accordance with some embodiments of the disclosure. With reference to FIG. 8, methods that may relate to UE 830 and hardware processing circuitry 840 are discussed below. Although the actions in the method 1200 of FIG. 12 are shown in a particular order, the order of the actions can be modified. Thus, the illustrated embodiments can be performed in a different order, and some actions may be performed in parallel. Some of the actions and/or operations listed in FIG. 12 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 830 and/or hardware processing circuitry 840 to perform an operation comprising the methods of FIG. 12. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 12.

Returning to FIG. 12, a method 1200 may comprise a processing 1210, a processing 1215, an associating 1220, and a processing 1230. In processing 1210, a first BRS transmission corresponding to a first Tx beam having a first beamwidth may be processed. In processing 1215, one or more second BRS transmissions respectively corresponding to one or more second Tx beams having a second beamwidth may be processed. In associating 1220, a PRACH may be associated with one of the second Tx beams. The first beamwidth may be greater than the second beamwidth.

In some embodiments, the first Tx beam may have a radial span substantially encompassing one or more respectively corresponding radial spans of the one or more second Tx beams. For some embodiments, the first BRS transmission may carry timing information. In some embodiments, the first BRS transmission and the one or more second BRS transmissions may be transmitted in the same subframe. For some embodiments, the first BRS transmission is transmitted in a first subframe, and the one or more second BRS transmissions are transmitted in a second subframe subsequent to the first subframe.

In processing 1230, an additional BRS transmission corresponding to another Tx beam having the first beamwidth may be processed. In some embodiments, the first BRS transmission may be coherently combined with the additional BRS transmission.

In some embodiments, at least one transmission of the first BRS transmission and the one or more second BRS transmissions may be transmitted within a BRS sequence that spans one OFDM symbol and may span a predetermined number of subcarrier frequencies across a predetermined number of PRBs. For some embodiments, the BRS sequence may span 72 subcarrier frequencies comprising at least one of: a wide beamwidth BRS, or a narrow beamwidth BRS. In some embodiments, the predetermined number of PRBs may be established at least in part by a Zadoff-Chu root sequence index. For some embodiments, the Zadoff-Chu root sequence index may be for a Synchronization Signal sequence generation. In some embodiments, the Synchronization Signal sequence generation is a PSS sequence generation. For some embodiments, the predetermined number of PRBs may be established at least in part by a Cell ID. In some embodiments, the predetermined number of PRBs may be established at least in part by a subframe index.

Figure 13:
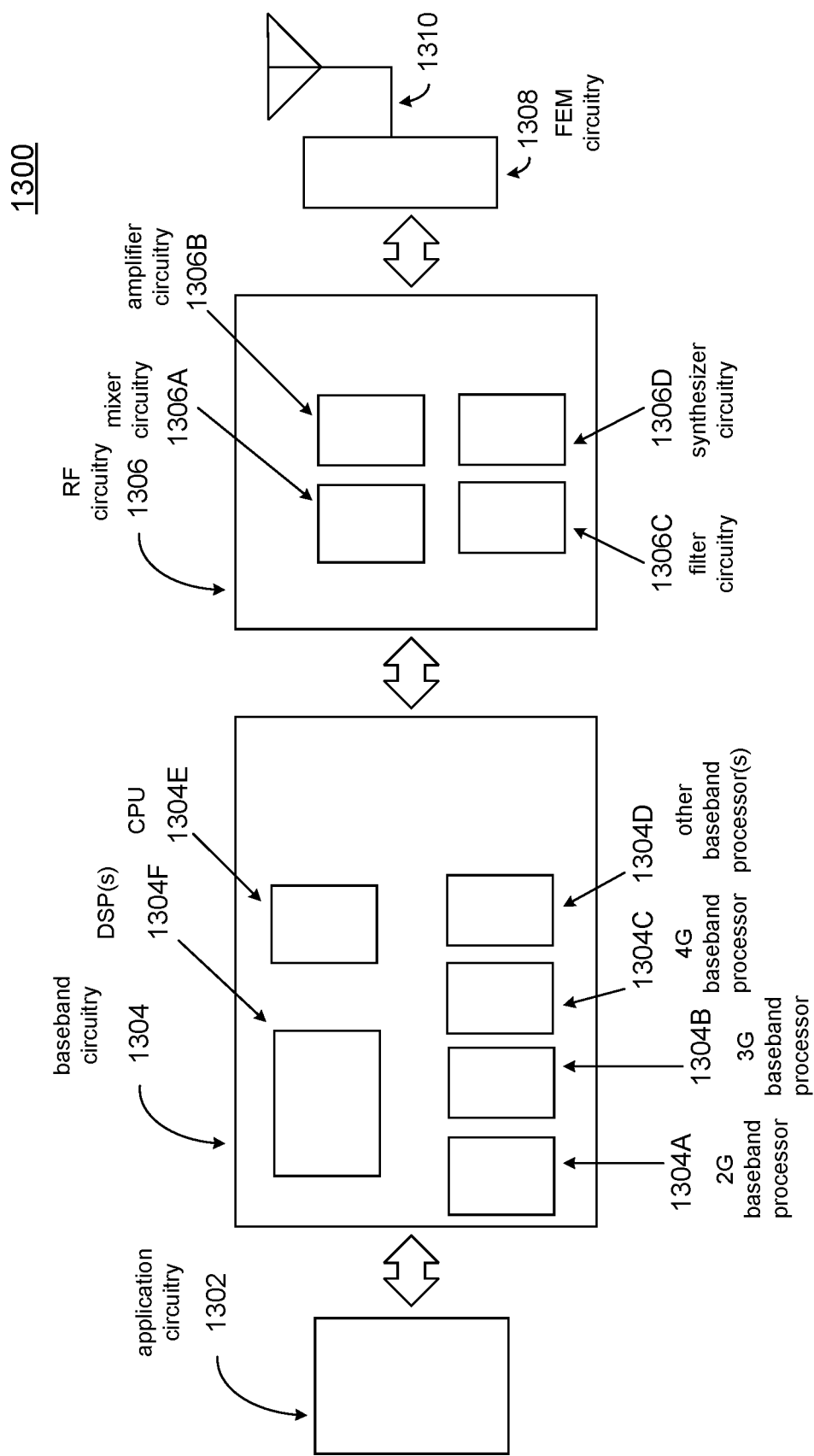
FIG. 13 illustrates example components of a UE device, in accordance with some embodiments of the disclosure.

FIG. 13 illustrates example components of a UE device, in accordance with some embodiments of the disclosure. In some embodiments, a UE device 1300 may include application circuitry 1302, baseband circuitry 1304, Radio Frequency (RF) circuitry 1306, front-end module (FEM) circuitry 1308, a low-power wake-up receiver (LP-WUR), and one or more antennas 1310, coupled together at least as shown. In some embodiments, the UE device 1300 may include additional elements such as, for example, memory/storage, display, camera, sensor, and/or input/output (I/O) interface.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuity 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304A, third generation (3G) baseband processor 1304B, fourth generation (4G) baseband processor 1304C, and/or other baseband processor(s) 1304D for other existing generations, generations in development or to be developed in the future (e.g., fifth generation (5G), 6G, etc.). The baseband circuitry 1304 (e.g., one or more of baseband processors 1304A-D) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1304E of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306A, amplifier circuitry 1306B and filter circuitry 1306C. The transmit signal path of the RF circuitry 1306 may include filter circuitry 1306C and mixer circuitry 1306A. RF circuitry 1306 may also include synthesizer circuitry 1306D for synthesizing a frequency for use by the mixer circuitry 1306A of the receive signal path and the transmit signal path. In some embodiments, the mixer circuitry 1306A of the receive signal path may be configured to down-convert RF signals received from the FEM circuitry 1308 based on the synthesized frequency provided by synthesizer circuitry 1306D. The amplifier circuitry 1306B may be configured to amplify the down-converted signals and the filter circuitry 1306C may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306A of the receive signal path may comprise passive mixers, although the scope of the embodiments is not limited in this respect.

In some embodiments, the mixer circuitry 1306A of the transmit signal path may be configured to up-convert input baseband signals based on the synthesized frequency provided by the synthesizer circuitry 1306D to generate RF output signals for the FEM circuitry 1308. The baseband signals may be provided by the baseband circuitry 1304 and may be filtered by filter circuitry 1306C. The filter circuitry 1306C may include a low-pass filter (LPF), although the scope of the embodiments is not limited in this respect.

In some embodiments, the mixer circuitry 1306A of the receive signal path and the mixer circuitry 1306A of the transmit signal path may include two or more mixers and may be arranged for quadrature down-conversion and/or up-conversion respectively. In some embodiments, the mixer circuitry 1306A of the receive signal path and the mixer circuitry 1306A of the transmit signal path may include two or more mixers and may be arranged for image rejection (e.g., Hartley image rejection). In some embodiments, the mixer circuitry 1306A of the receive signal path and the mixer circuitry 1306A may be arranged for direct down-conversion and/or direct up-conversion, respectively. In some embodiments, the mixer circuitry 1306A of the receive signal path and the mixer circuitry 1306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306D may be a fractional-N synthesizer or a fractional N/N+1 synthesizer, although the scope of the embodiments is not limited in this respect as other types of frequency synthesizers may be suitable. For example, synthesizer circuitry 1306D may be a delta-sigma synthesizer, a frequency multiplier, or a synthesizer comprising a phase-locked loop with a frequency divider.

The synthesizer circuitry 1306D may be configured to synthesize an output frequency for use by the mixer circuitry 1306A of the RF circuitry 1306 based on a frequency input and a divider control input. In some embodiments, the synthesizer circuitry 1306D may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306D of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE 1300 comprises a plurality of power saving mechanisms. If the UE 1300 is in an RRC Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1300 may transition off to an RRC Idle state, where it disconnects from the network and does not perform operations such as channel quality feedback, handover, etc. The UE 1300 goes into a very low power state and it performs paging where again it periodically wakes up to listen to the network and then powers down again. Since the device might not receive data in this state, in order to receive data, it should transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

In addition, in various embodiments, an eNB may include components substantially similar to one or more of the example components of UE device 1300 described herein.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of an Evolved Node B (eNB) operable to communicate with a User Equipment (UE) on a wireless network, comprising: one or more processors to: associate a first Beam Reference Signal (BRS) for a first Transmit (Tx) beam having a first beamwidth with one or more second BRSes for one or more respectively corresponding second Tx beams having a second beamwidth; generate a first BRS transmission carrying the first BRS; and generate one or more second BRS transmissions carrying the one or more respectively corresponding second BRSes, wherein the first beamwidth is greater than the second beamwidth.

In example 2, the apparatus of example 1, wherein the association of the first BRS with the one or more second BRSes is predetermined.

In example 3, the apparatus of either of examples 1 or 2, wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

In example 4, the apparatus of any of examples 1 through 3, wherein the first Tx beam has a radial span substantially encompassing one or more respectively corresponding radial spans of the one or more second Tx beams.

In example 5, the apparatus of any of examples 1 through 4, wherein the first BRS transmission carries timing information.

In example 6, the apparatus of any of examples 1 through 5, wherein the one or more processors are to: associate a Physical Random Access Channel (PRACH) with one of the second Tx beams.

In example 7, the apparatus of any of examples 1 through 6, wherein the first BRS transmission and the one or more second BRS transmissions are transmitted in the same subframe.

In example 8, the apparatus of any of examples 1 through 6 wherein the first BRS transmission is transmitted in a first subframe, and the one or more second BRS transmissions are transmitted in a second subframe subsequent to the first subframe.

In example 9, the apparatus of any of examples 1 through 8, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 10, the apparatus of example 9, wherein the BRS sequence spans 72 subcarrier frequencies comprising at least one of: a wide beamwidth BRS, or a narrow beamwidth BRS.

In example 11, the apparatus of either of examples 9 or 10, wherein the predetermined number of PRBs is established at least in part by a Zadoff-Chu root sequence index.

In example 12, the apparatus of example 11, wherein the Zadoff-Chu root sequence index is for a Synchronization Signal sequence generation.

In example 13, the apparatus of example 12, wherein the Synchronization Signal sequence generation is a Primary Synchronization Signal (PSS) sequence generation.

In example 14, the apparatus of any of examples 9 through 13, wherein the predetermined number of PRBs is established at least in part by a Cell Identification number (Cell ID).

In example 15, the apparatus of any of examples 9 through 14, wherein the predetermined number of PRBs is established at least in part by a subframe index.

Example 16 provides an Evolved Node B (eNB) device comprising an application processor, a memory, one or more antenna ports, and an interface for allowing the application processor to communicate with another device, the eNB device including the apparatus of any of examples 1 through 15.

Example 17 provides a method comprising: associating a first Beam Reference Signal (BRS) for a first Transmit (Tx) beam having a first beamwidth with one or more second BRSes for one or more respectively corresponding second Tx beams having a second beamwidth; generating a first BRS transmission carrying the first BRS; and generating one or more second BRS transmissions carrying the one or more respectively corresponding second BRSes, wherein the first beamwidth is greater than the second beamwidth.

In example 18, the method of example 17, wherein the association of the first BRS with the one or more second BRSes is predetermined.

In example 19, the method of either of examples 17 or 18, wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

In example 20, the method of any of examples 17 through 19, wherein the first Tx beam has a radial span substantially encompassing one or more respectively corresponding radial spans of the one or more second Tx beams.

In example 21, the method of any of examples 17 through 20, wherein the first BRS transmission carries timing information.

In example 22, the method of any of examples 17 through 21, the operation comprising: associating a Physical Random Access Channel (PRACH) with one of the second Tx beams.

In example 23, the method of any of examples 17 through 22, wherein the first BRS transmission and the one or more second BRS transmissions are transmitted in the same subframe.

In example 24, the method of any of examples 17 through 22, wherein the first BRS transmission is transmitted in a first subframe, and the one or more second BRS transmissions are transmitted in a second subframe subsequent to the first subframe.

In example 25, the method of any of examples 17 through 24, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 26, the method of example 25, wherein the BRS sequence spans 72 subcarrier frequencies comprising at least one of: a wide beamwidth BRS, or a narrow beamwidth BRS.

In example 27, the method of either of examples 25 or 26, wherein the predetermined number of PRBs is established at least in part by a Zadoff-Chu root sequence index.

In example 28, the method of example 27, wherein the Zadoff-Chu root sequence index is for a Synchronization Signal sequence generation.

In example 29, the method of example 28, wherein the Synchronization Signal sequence generation is a Primary Synchronization Signal (PSS) sequence generation.

In example 30, the method of any of examples 25 through 29, wherein the predetermined number of PRBs is established at least in part by a Cell Identification number (Cell ID).

In example 31, the method of any of examples 25 through 30, wherein the predetermined number of PRBs is established at least in part by a subframe index.

Example 32 provides machine readable storage media having machine executable instructions stored thereon that, when executed, cause one or more processors to perform a method according to any of examples 17 through 31.

Example 33 provides an apparatus of an Evolved Node B (eNB) operable to communicate with a User Equipment (UE) on a wireless network, comprising: means for associating a first Beam Reference Signal (BRS) for a first Transmit (Tx) beam having a first beamwidth with one or more second BRSes for one or more respectively corresponding second Tx beams having a second beamwidth; means for generating a first BRS transmission carrying the first BRS; and means for generating one or more second BRS transmissions carrying the one or more respectively corresponding second BRSes, wherein the first beamwidth is greater than the second beamwidth.

In example 34, the apparatus of example 33, wherein the association of the first BRS with the one or more second BRSes is predetermined.

In example 35, the apparatus of either of examples 33 or 34, wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

In example 36, the apparatus of any of examples 33 through 35, wherein the first Tx beam has a radial span substantially encompassing one or more respectively corresponding radial spans of the one or more second Tx beams.

In example 37, the apparatus of any of examples 33 through 36, wherein the first BRS transmission carries timing information.

In example 38, the apparatus of any of examples 33 through 37, the operation comprising: means for associating a Physical Random Access Channel (PRACH) with one of the second Tx beams.

In example 39, the apparatus of any of examples 33 through 38, wherein the first BRS transmission and the one or more second BRS transmissions are transmitted in the same subframe.

In example 40, the apparatus of any of examples 33 through 38, wherein the first BRS transmission is transmitted in a first subframe, and the one or more second BRS transmissions are transmitted in a second subframe subsequent to the first subframe.

In example 41, the apparatus of any of examples 33 through 40, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 42, the apparatus of example 41, wherein the BRS sequence spans 72 subcarrier frequencies comprising at least one of: a wide beamwidth BRS, or a narrow beamwidth BRS.

In example 43, the apparatus of either of examples 41 or 42, wherein the predetermined number of PRBs is established at least in part by a Zadoff-Chu root sequence index.

In example 44, the apparatus of example 43, wherein the Zadoff-Chu root sequence index is for a Synchronization Signal sequence generation.

In example 45, the apparatus of example 44, wherein the Synchronization Signal sequence generation is a Primary Synchronization Signal (PSS) sequence generation.

In example 46, the apparatus of any of examples 41 through 45, wherein the predetermined number of PRBs is established at least in part by a Cell Identification number (Cell ID).

Example 47 provides machine readable storage media having machine executable instructions that, when executed, cause one or more processors of an Evolved Node B (eNB) to perform an operation comprising: associate a first Beam Reference Signal (BRS) for a first Transmit (Tx) beam having a first beamwidth with one or more second BRSes for one or more respectively corresponding second Tx beams having a second beamwidth; generate a first BRS transmission carrying the first BRS; and generate one or more second BRS transmissions carrying the one or more respectively corresponding second BRSes, wherein the first beamwidth is greater than the second beamwidth.

In example 48, the machine readable storage media of example 47, wherein the association of the first BRS with the one or more second BRSes is predetermined.

In example 49, the machine readable storage media of either of examples 47 or 48, wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

In example 50, the machine readable storage media of any of examples 47 through 49, wherein the first Tx beam has a radial span substantially encompassing one or more respectively corresponding radial spans of the one or more second Tx beams.

In example 51, the machine readable storage media of any of examples 47 through 50, wherein the first BRS transmission carries timing information.

In example 52, the machine readable storage media of any of examples 47 through 51, the operation comprising: associate a Physical Random Access Channel (PRACH) with one of the second Tx beams.

In example 53, the machine readable storage media of any of examples 47 through 52, wherein the first BRS transmission and the one or more second BRS transmissions are transmitted in the same subframe.

In example 54, the machine readable storage media of any of examples 47 through 52, wherein the first BRS transmission is transmitted in a first subframe, and the one or more second BRS transmissions are transmitted in a second subframe subsequent to the first subframe.

In example 55, the machine readable storage media of any of examples 47 through 54, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 56, the machine readable storage media of example 55, wherein the BRS sequence spans 72 subcarrier frequencies comprising at least one of: a wide beamwidth BRS, or a narrow beamwidth BRS.

In example 57, the machine readable storage media of either of examples 55 or 56, wherein the predetermined number of PRBs is established at least in part by a Zadoff-Chu root sequence index.

In example 58, the machine readable storage media of example 57, wherein the Zadoff-Chu root sequence index is for a Synchronization Signal sequence generation.

In example 59, the machine readable storage media of example 58, wherein the Synchronization Signal sequence generation is a Primary Synchronization Signal (PSS) sequence generation.

In example 60, the machine readable storage media of any of examples 55 through 59, wherein the predetermined number of PRBs is established at least in part by a Cell Identification number (Cell ID).

In example 61, the machine readable storage media of any of examples 55 through 60, wherein the predetermined number of PRBs is established at least in part by a subframe index.

Example 62 provides an apparatus of a User Equipment (UE) operable to communicate with an Evolved Node B (eNB) on a wireless network, comprising: one or more processors to: process a first Beam Reference Signal (BRS) transmission corresponding to a first Transmit (Tx) beam having a first beamwidth; process one or more second BRS transmissions respectively corresponding to one or more second Tx beams having a second beamwidth; and associate a Physical Random Access Channel (PRACH) with one of the second Tx beams, wherein the first beamwidth is greater than the second beamwidth.

In example 63, the apparatus of example 62, wherein the first Tx beam has a radial span substantially encompassing one or more respectively corresponding radial spans of the one or more second Tx beams.

In example 64, the apparatus of either of examples 62 or 63, wherein the first BRS transmission carries timing information.

In example 65, the apparatus of any of examples 62 through 64, wherein the first BRS transmission and the one or more second BRS transmissions are transmitted in the same subframe.

In example 66, the apparatus of any of examples 62 through 64, wherein the first BRS transmission is transmitted in a first subframe, and the one or more second BRS transmissions are transmitted in a second subframe subsequent to the first subframe.

In example 67, the apparatus of any of examples 62 through 66, wherein the one or more processors are to: process an additional Beam Reference Signal (BRS) transmission corresponding to another Transmit (Tx) beam having the first beamwidth, wherein the first BRS transmission is coherently combined with the additional BRS transmission.

In example 68, the apparatus of any of examples 62 through 67, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 69, the apparatus of example 68, wherein the BRS sequence spans 72 subcarrier frequencies comprising at least one of: a wide beamwidth BRS, or a narrow beamwidth BRS.

In example 70, the apparatus of either of examples 68 or 69, wherein the predetermined number of PRBs is established at least in part by a Zadoff-Chu root sequence index.

In example 71, the apparatus of example 70, wherein the Zadoff-Chu root sequence index is for a Synchronization Signal sequence generation.

In example 72, the apparatus of example 71, wherein the Synchronization Signal sequence generation is a Primary Synchronization Signal (PSS) sequence generation.

In example 73, the apparatus of any of examples 68 through 72, wherein the predetermined number of PRBs is established at least in part by a Cell Identification number (Cell ID).

In example 74, the apparatus of any of examples 68 through 73, wherein the predetermined number of PRBs is established at least in part by a subframe index.

Example 75 provides a User Equipment (UE) device comprising an application processor, a memory, one or more antennas, a wireless interface for allowing the application processor to communicate with another device, and a touchscreen display, the UE device including the apparatus of any of examples 62 through 74.

Example 76 provides a method comprising: processing a first Beam Reference Signal (BRS) transmission corresponding to a first Transmit (Tx) beam having a first beamwidth; processing one or more second BRS transmissions respectively corresponding to one or more second Tx beams having a second beamwidth; and associating a Physical Random Access Channel (PRACH) with one of the second Tx beams, wherein the first beamwidth is greater than the second beamwidth.

In example 77, the method of example 76, wherein the first Tx beam has a radial span substantially encompassing one or more respectively corresponding radial spans of the one or more second Tx beams.

In example 78, the method of either of examples 76 or 77, wherein the first BRS transmission carries timing information.

In example 79, the method of any of examples 76 through 78, wherein the first BRS transmission and the one or more second BRS transmissions are transmitted in the same subframe.

In example 80, the method of any of examples 76 through 78, wherein the first BRS transmission is transmitted in a first subframe, and the one or more second BRS transmissions are transmitted in a second subframe subsequent to the first subframe.

In example 81, the method of any of examples 76 through 80, the operation comprising: processing an additional Beam Reference Signal (BRS) transmission corresponding to another Transmit (Tx) beam having the first beamwidth, wherein the first BRS transmission is coherently combined with the additional BRS transmission.

In example 82, the method of any of examples 76 through 81, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 83, the method of example 82, wherein the BRS sequence spans 72 subcarrier frequencies comprising at least one of: a wide beamwidth BRS, or a narrow beamwidth BRS.

In example 84, the method of either of examples 82 or 83, wherein the predetermined number of PRBs is established at least in part by a Zadoff-Chu root sequence index.

In example 85, the method of example 84, wherein the Zadoff-Chu root sequence index is for a Synchronization Signal sequence generation.

In example 86, the method of example 85, wherein the Synchronization Signal sequence generation is a Primary Synchronization Signal (PSS) sequence generation.

In example 87, the method of any of examples 82 through 86, wherein the predetermined number of PRBs is established at least in part by a Cell Identification number (Cell ID).

In example 88, the method of any of examples 82 through 87, wherein the predetermined number of PRBs is established at least in part by a subframe index.

Example 89 provides machine readable storage media having machine executable instructions stored thereon that, when executed, cause one or more processors to perform a method according to any of examples 76 through 88.

Example 90 provides an apparatus of a User Equipment (UE) operable to communicate with an Evolved Node B (eNB) on a wireless network, comprising: means for processing a first Beam Reference Signal (BRS) transmission corresponding to a first Transmit (Tx) beam having a first beamwidth; means for processing one or more second BRS transmissions respectively corresponding to one or more second Tx beams having a second beamwidth; and means for associating a Physical Random Access Channel (PRACH) with one of the second Tx beams, wherein the first beamwidth is greater than the second beamwidth.

In example 91, the apparatus of example 90, wherein the first Tx beam has a radial span substantially encompassing one or more respectively corresponding radial spans of the one or more second Tx beams.

In example 92, the apparatus of either of examples 90 or 91, wherein the first BRS transmission carries timing information.

In example 93, the apparatus of any of examples 90 through 92, wherein the first BRS transmission and the one or more second BRS transmissions are transmitted in the same subframe.

In example 94, the apparatus of any of examples 90 through 92, wherein the first BRS transmission is transmitted in a first subframe, and the one or more second BRS transmissions are transmitted in a second subframe subsequent to the first subframe.

In example 95, the apparatus of any of examples 90 through 94, the operation comprising: means for processing an additional Beam Reference Signal (BRS) transmission corresponding to another Transmit (Tx) beam having the first beamwidth, wherein the first BRS transmission is coherently combined with the additional BRS transmission.

In example 96, the apparatus of any of examples 90 through 95, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 97, the apparatus of example 96, wherein the BRS sequence spans 72 subcarrier frequencies comprising at least one of: a wide beamwidth BRS, or a narrow beamwidth BRS.

In example 98, the apparatus of either of examples 96 or 97, wherein the predetermined number of PRBs is established at least in part by a Zadoff-Chu root sequence index.

In example 99, the apparatus of example 98, wherein the Zadoff-Chu root sequence index is for a Synchronization Signal sequence generation.

In example 100, the apparatus of example 99, wherein the Synchronization Signal sequence generation is a Primary Synchronization Signal (PSS) sequence generation.

In example 101, the apparatus of any of examples 96 through 100, wherein the predetermined number of PRBs is established at least in part by a Cell Identification number (Cell ID).

In example 102, the apparatus of any of examples 96 through 101, wherein the predetermined number of PRBs is established at least in part by a subframe index.

Example 103 provides machine readable storage media having machine executable instructions that, when executed, cause one or more processors of a User Equipment (UE) to perform an operation comprising: process a first Beam Reference Signal (BRS) transmission corresponding to a first Transmit (Tx) beam having a first beamwidth; process one or more second BRS transmissions respectively corresponding to one or more second Tx beams having a second beamwidth; and associate a Physical Random Access Channel (PRACH) with one of the second Tx beams, wherein the first beamwidth is greater than the second beamwidth.

In example 104, the machine readable storage media of example 103, wherein the first Tx beam has a radial span substantially encompassing one or more respectively corresponding radial spans of the one or more second Tx beams.

In example 105, the machine readable storage media of either of examples 103 or 104, wherein the first BRS transmission carries timing information.

In example 106, the machine readable storage media of any of examples 103 through 105, wherein the first BRS transmission and the one or more second BRS transmissions are transmitted in the same subframe.

In example 107, the machine readable storage media of any of examples 103 through 105, wherein the first BRS transmission is transmitted in a first subframe, and the one or more second BRS transmissions are transmitted in a second subframe subsequent to the first subframe.

In example 108, the machine readable storage media of any of examples 103 through 107, the operation comprising: process an additional Beam Reference Signal (BRS) transmission corresponding to another Transmit (Tx) beam having the first beamwidth, wherein the first BRS transmission is coherently combined with the additional BRS transmission.

In example 109, the machine readable storage media of any of examples 103 through 108, wherein at least one transmission of the first BRS transmission and the one or more second BRS transmissions is transmitted within a BRS sequence that spans one Orthogonal Frequency-Division Multiplexing (OFDM) symbol and spans a predetermined number of subcarrier frequencies across a predetermined number of Physical Resource Blocks (PRBs).

In example 110, the machine readable storage media of example 109, wherein the BRS sequence spans 72 subcarrier frequencies comprising at least one of: a wide beamwidth BRS, or a narrow beamwidth BRS.

In example 111, the machine readable storage media of either of examples 109 or 110, wherein the predetermined number of PRBs is established at least in part by a Zadoff-Chu root sequence index.

In example 112, the machine readable storage media of example 111, wherein the Zadoff-Chu root sequence index is for a Synchronization Signal sequence generation.

In example 113, the machine readable storage media of example 112, wherein the Synchronization Signal sequence generation is a Primary Synchronization Signal (PSS) sequence generation.

In example 114, the machine readable storage media of any of examples 109 through 113, wherein the predetermined number of PRBs is established at least in part by a Cell Identification number (Cell ID).

In example 115, the machine readable storage media of any of examples 109 through 114, wherein the predetermined number of PRBs is established at least in part by a subframe index.

In example 116, the apparatus of any of examples 1 through 15 and 62 through 74, wherein the one or more processors comprise a baseband processor.

In example 117, the apparatus of any of examples 1 through 15 and 62 through 74, comprising a transceiver circuitry for at least one of: generating transmissions, encoding transmissions, processing transmissions, or decoding transmissions.

In example 118, the apparatus of any of examples 1 through 15 and 62 through 74, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of an Evolved Node-B (eNB) operable to communicate with a User Equipment (UE) on a wireless network, comprising:
one or more processors configured to:
associate a first Beam Reference Signal (BRS) for a first Transmit (Tx) beam having a first beamwidth with one or more second BRSes for one or more respectively corresponding second Tx beams having a second beamwidth;
generate a first BRS transmission to the UE carrying the first BRS based at least in part on the association of the first BRS with the one or more second BRSes; and
generate one or more second BRS transmissions to the UE carrying the one or more respectively corresponding second BRSes based at least in part on the association of the first BRS with the one or more second BRSes,
wherein the first beamwidth is greater than the second beamwidth; and
wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

2. The apparatus of claim 1, wherein the association of the first BRS with the one or more second BRSes is predetermined.

3. The apparatus of claim 1, wherein the first Tx beam has a radial span substantially encompassing one or more respectively corresponding radial spans of the one or more second Tx beams.

4. The apparatus of claim 1, wherein the first BRS transmission carries timing information.

5. The apparatus of claim 1, wherein the one or more processors are further configured to:
associate a Physical Random Access Channel (PRACH) with one of the second Tx beams.

6. Non-transitory machine readable storage media having machine executable instructions that, when executed, cause one or more processors of an Evolved Node-B (eNB) to perform operations comprising:
associating a first Beam Reference Signal (BRS) for a first Transmit (Tx) beam having a first beamwidth with one or more second BRSes for one or more respectively corresponding second Tx beams having a second beamwidth;
generating a first BRS transmission to a User Equipment (UE) carrying the first BRS based at least in part on the association of the first BRS with the one or more second BRSes; and
generating one or more second BRS transmissions to the UE carrying the one or more respectively corresponding second BRSes based at least in part on the association of the first BRS with the one or more second BRSes,
wherein the first beamwidth is greater than the second beamwidth; and
wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission.

7. The non-transitory machine readable storage media of claim 6, wherein the association of the first BRS with the one or more second BRSes is predetermined.

8. The non-transitory machine readable storage media of claim 6, wherein the first Tx beam has a radial span substantially encompassing one or more respectively corresponding radial spans of the one or more second Tx beams.

9. The non-transitory machine readable storage media of claim 6, wherein the first BRS transmission carries timing information.

10. The non-transitory machine readable storage media of claim 6, wherein the operations further comprise:
associating a Physical Random Access Channel (PRACH) with one of the second Tx beams.

11. An apparatus of a User Equipment (UE) operable to communicate with an Evolved Node-B (eNB) on a wireless network, comprising:
one or more processors configured to:
process a first Beam Reference Signal (BRS) transmission corresponding to a first Transmit (Tx) beam having a first beamwidth;
process one or more second BRS transmissions respectively corresponding to one or more second Tx beams having a second beamwidth based at least in part on the processing of the first BRS transmission;
associate a Physical Random Access Channel (PRACH) with one of the second Tx beams, and
associate the first BRS with the one or more second BRSes, wherein the association of the first BRS with the one or more second BRSes is configured by at least one of: a Master Information Block (MIB) transmission, a System Information Block (SIB) transmission, a Primary Synchronization Signal (PSS) transmission, or a Secondary Synchronization Signal (SSS) transmission,
wherein the first beamwidth of the first BRS transmission is greater than the second beamwidth of the second BRS transmission.

12. The apparatus of claim 11, wherein the first Tx beam has a radial span substantially encompassing one or more respectively corresponding radial spans of the one or more second Tx beams.

13. The apparatus of claim 11, wherein the first BRS transmission carries timing information.

14. The apparatus of claim 11, wherein the first BRS transmission and the one or more second BRS transmissions are transmitted in the same subframe.

15. The apparatus of claim 11, wherein the first BRS transmission is transmitted in a first subframe, and the one or more second BRS transmissions are transmitted in a second subframe subsequent to the first subframe.

16. The apparatus of claim 11, wherein the one or more processors are further configured to:
process an additional Beam Reference Signal (BRS) transmission corresponding to another Transmit (Tx) beam having the first beamwidth,
wherein the first BRS transmission is coherently combined with the additional BRS transmission.

17. The apparatus of claim 11, wherein at least one of the first BRS transmission or the one or more second BRS transmissions are received within a BRS sequence that spans one orthogonal frequency-division multiplexing (OFDM) symbol.

18. The apparatus of claim 11,
wherein to process the first BRS transmission the at least one processor is configured to train a Receive (Rx) beam based at least in part on the first BRS transmission; and
wherein to process the one or more second BRS transmissions the least one processor is configured to measure the one or more second BRS transmissions based at least in part on the training the Rx beam.

19. Non-transitory machine readable storage media having machine executable instructions that, when executed, cause one or more processors of a User Equipment (UE) to perform operations comprising:
processing a first Beam Reference Signal (BRS) transmission corresponding to a first Transmit (Tx) beam having a first beamwidth;
processing one or more second BRS transmissions respectively corresponding to one or more second Tx beams having a second beamwidth based at least in part on the processing of the first BRS transmission; and
associating a Physical Random Access Channel (PRACH) with one of the second Tx beams; and
associating the first BRS with the one or more second BRSes, wherein the association of the first BRS with the one or more second B RSes is configured by at least one of: a Master Information Block (MIB) transmission, a System Information Block (SIB) transmission, a Primary Synchronization Signal (PSS) transmission, or a Secondary Synchronization Signal (SSS) transmission,
wherein the first beamwidth of the first BRS transmission is greater than the second beamwidth of the second BRS transmission; and
wherein the first BRS transmission carries timing information.

20. The non-transitory machine readable storage media of claim 19, wherein the first Tx beam has a radial span substantially encompassing one or more respectively corresponding radial spans of the one or more second Tx beams.

21. The non-transitory machine readable storage media of claim 19, wherein the first BRS transmission carries timing information.

22. The non-transitory machine readable storage media of claim 19, wherein the first BRS transmission and the one or more second BRS transmissions are transmitted in the same subframe.

23. The non-transitory machine readable storage media of claim 19, wherein the first BRS transmission is transmitted in a first subframe, and the one or more second BRS transmissions are transmitted in a second subframe subsequent to the first subframe.

24. The non-transitory machine readable storage media of claim 19, wherein the operations further comprise:
   processing an additional Beam Reference Signal (BRS) transmission corresponding to another Transmit (Tx) beam having the first beamwidth,
   wherein the first BRS transmission is coherently combined with the additional BRS transmission.

* * * * *